United States Patent [19]

Stevens

[11] 4,028,699
[45] June 7, 1977

[54] SEARCH RADAR

[75] Inventor: Robert R. Stevens, Chelmsford, Mass.

[73] Assignee: Sanders Associates, Inc., Nashua, N.H.

[22] Filed: Dec. 13, 1974

[21] Appl. No.: 532,344

[52] U.S. Cl. .............................. 343/9; 343/17.2 PC; 343/100 CL
[51] Int. Cl.² ....................... G01S 9/233; G01S 9/44
[58] Field of Search ...... 343/8, 9, 17.2 PC, 100 CL

[56] References Cited

UNITED STATES PATENTS

| | | | |
|---|---|---|---|
| 3,388,398 | 6/1968 | Kratzer et al. | 343/8 X |
| 3,525,993 | 8/1970 | Peace et al. | 343/8 |
| 3,599,209 | 8/1971 | Goodrich | 343/9 |
| 3,611,375 | 10/1971 | Chambers et al. | 343/8 X |
| 3,801,982 | 4/1974 | Richmond | 343/9 |
| 3,887,918 | 6/1975 | Bailey et al. | 343/17.2 PC X |

Primary Examiner—T.H. Tubbesing

Attorney, Agent, or Firm—Louis Etlinger; Robert K. Tendler

[57] ABSTRACT

A pulsed doppler search radar is disclosed in which range, bearing, and radial velocity are made available for display. The radar incorporates a capacitor matrix correlator and an improved method of range determination utilizing passive decoding circuitry and sequential unblanking of the capacitor correlator matrix drivers where required. Moreover, a passive implementation of the doppler direction algorithm is provided in which a summing circuit is implemented on the same printed circuit board utilized to form the capacitor correlator matrix. The capacitor matrix correlator and doppler direction summing circuit are manufactured through the use of face-to-face printed circuit boards having overlying sections patterned and registered so as to form the capacitive elements thereby simplifying the manufacture of the doppler correlator and doppler direction circuits.

27 Claims, 28 Drawing Figures

VERTICAL DATA INPUT BOARD

HORIZONTAL SUMMATION BOARD

SEARCH RADAR

This invention relates to search radars and more particularly to both a search radar system, and also to several subsystems having application not only in search radars but also in various other signal correlating and signal processing circuits.

While the invention will be described in terms of a search radar, it will be appreciated that the correlator, hybrid range gate, and doppler direction processing circuitry to be described has application not only for radars, sonars, and the like but also for signal processing circuits in which correlation between an incoming signal and a predetermined signal is required.

Pulse doppler search radars are well known in the art and generally comprise a transmitter for transmitting relatively long pulses of a given carrier frequency. When these pulses impinge on a target they are returned to a radar receiver at the transmitter site with range information carried by the time interval between a transmitted pulse and a received pulse. Radial velocity information is carried in terms of the doppler frequency shift engendered by the target either moving towards or away from the transmitter. Processing of the return signals in the past has required not only a large number of range gates but also a large amount of active correlating and signal processing circuitry as outlined in U.S. Pat. No. 3,496,544 issued to M. R. Richmond et al on Feb. 17, 1970.

In the signal correlation apparatus described in that patent, magnetic core memories and correlators are utilized which are not only heavy, expensive, and requiring hand stitching or fabrication, but also have associated with it stray inductances which limit the speed at which the correlator can operate. Moreover, the resistor matrices utilized in the prior art require over 2,000 individual resistors in one operative configuration.

In short, the problems confronting the prior art correlator and doppler radar processing systems are low speed, high cost, complicated and costly drive circuitry, large size, excessive weight, insufficient rigidity and large numbers of interconnections. With respect to the speed, the inherent reluctance of the magnetic cores and the inherent wiring inductance limits speed due to the inductive hysteresis. With respect to cost, the cores in addition to being expensive also suffer from the necessity of a handwiring operation which results in excessive labor charges. Moreover, each of the cores requires transformer drive circuitry which adds to the cost not only becuase of the increased materials but also because of the labor. Fabrication, therefore, of magnetic correlator matrices and drive circuits requires handwiring and and increases the bulk of the overall system. Weight and rigidity are also sacrificed due to the bulk of the components and the relatively massive mounting systems used for mounting the cores.

In the subject system the problems of the prior art are overcome by the utilization of a capacitor matrix correlator which is fabricated from appropriately patterned face-to-face printed circuit boards. The driving circuitry for the capacitor matrix requires no transformers and is so configured that range information is easily readout and sequential unblanking of drivers can be readily accomplished for those range samples where eclipsing occurs. "Eclipsing" occurs when pulses relfected by the target are returned to the radar pulse is being transmitted. When radar pulses are transmitted the radar receiver is turned off and thus pulses returned to the receiver at this time are not received and are thus lost. These pulses are said to be eclipsed.

Moreover, the algorithm normally used in determining whether a radar target is incoming or outgoing is implemented on the circuit boards themselves such that by appropriate summing a correlated output indicates not only the speed of the target but also the direction of the doppler shift and therefore whether the target is incoming or outgoing. It should be stressed that this is all done by passive networks such that the speed at which the signal processing occurs is at least an order of magnitude improvement over the magnetic core system or an analogous fast Fourier Transform (FFT) system. This allows real time processing of very large bandwidth pulse doppler signals. The reason for the relatively high speed of the subject system can be explained by reference to the magnetic core matrix system. In the magnetic core system, reading lines of information into the correlator takes a relatively long time because time must be allowed for the cores to return to an initial state. With the subject capacitor matrix the capacitor charge/discharge time is almost instantaneous, therefore permitting rapid input.

The description of the subject invention will be divided into three categories for ease of presentation. The first category will be a description of the correlator including a three level approximation technique, the capacitor correlator matrix and its method of manufacture, the three level driver and both "bulk" and "slideby" processing. The discussion will continue with a description of the passive doppler direction processing circuitry including the implementation of the doppler direction algorithm through a summing matrix. Finally, a hybrid coded range information generating system implemented at the correlator driver section will be described.

As will be seen from the description of these three functional elements of the search radar, all of the coding and decoding and all of the information extraction is accomplished by passive elements in the sense that all decoding, correlating and summing is accomplished by non-switched components which distinguishes the subject system from general purpose computer processing systems.

As will be apparent, not only does the subject processing circuitry relate to doppler radar, it relates as well to speech analysis, secure communications and pattern recognition or any application where signal correlation is required.

It is therefore an object of this invention to provide an improved signal processing system for pulsed doppler radars.

It is another object of this invention to provide an improved high speed correlator utilizing a capacitor correlator matrix.

It is a further object of this invention to provide a unique driving arrangement for a capacitor matrix.

It is a still further object of this invention to provide a hybrid range gating system for use with radars utilizing capacitor matrix correlators by sequentially unblanking drivers as information is being clocked down a shift register.

It is a still further object of this invention to provide an improved range readout system in which range is readout as a function of the number of data shifts that have taken place when a positive correlation occurs.

It is yet another object of this invention to provide an improved implementation of the doppler-direction algorithm using only passive components.

It is a further object of this invention to implement the doppler direction algorithm with a capacitor correlator and a correlator output summing matrix.

It is another object of this invention to provide a capacitor matrix correlator fabricated from facing printed circuit boards having patterned conductors thereon.

It is a further object of this invention to fabricate a combined capacitor matrix correlator and doppler direction sensor with patterned printed circuit boards.

It is a yet still further object of this invention to provide novel apparatus for multiplying two signals.

It is a yet still further object of this invention to provide an improved method of correlating signals with an improved method of multiplying.

These and other objects of this invention will be better understood in connection with the following description in view of the appended drawings in which.

DETAILED DESCRIPTION a. Search Radar

Figure 1:
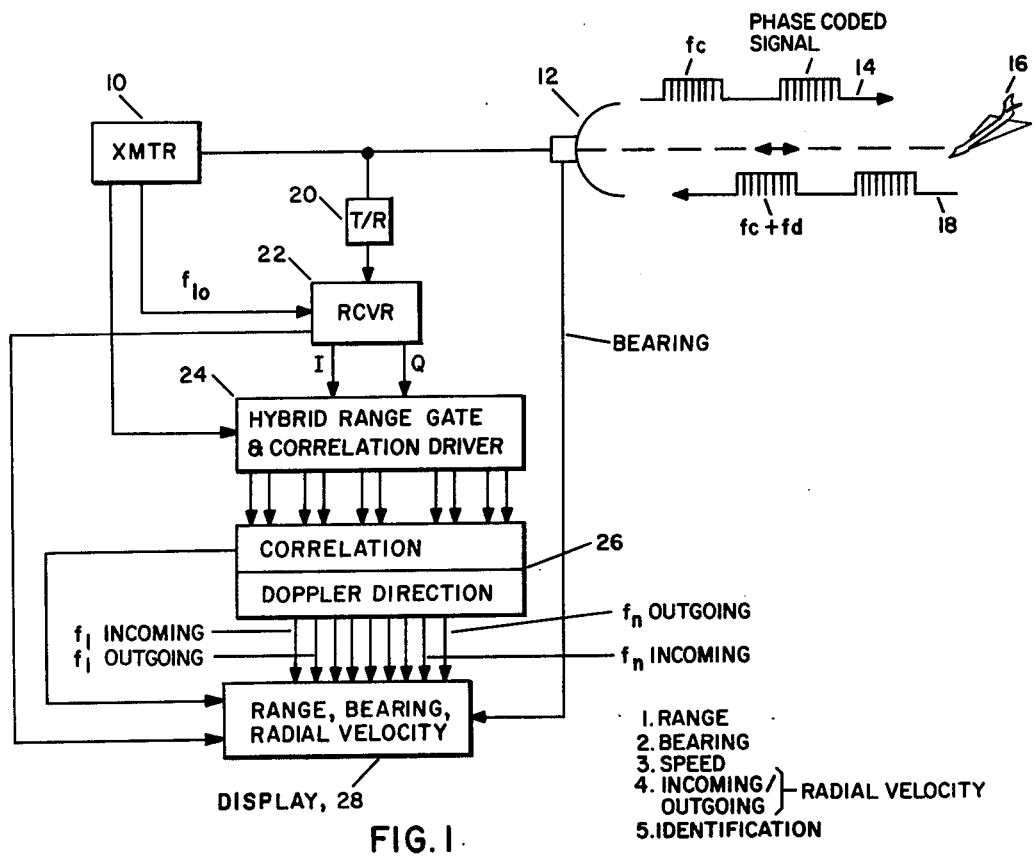
FIG. 1 is a block diagram illustrating the major components of the subject search radar.

Referring now to FIG. 1, a schematic and block diagram of the major components of the subject search radar are illustrated. As illustrated, a transmitter 10 has its output signal coupled to a directive antenna 12 which projects a phase coded pulsed signal 14 for fine range determination having a carrier frequency $f_c$ towards a target 16, from which a signal 18 is returned to antenna 12. Assuming target 16 is moving, the return pulse has a carrier frequency $f_c$ shifted by an amount $f_d$. The phase coding of the transmitted pulse is preserved in the return signal so that range information can be extracted from it in a later signal processing stage.

The return signal is coupled through a transmit/-receive switch 20 to a receiver 22 which homodynes the received signal with a local oscillator signal, having a frequency $f_{lo}$ equal to $f_c$, to produce quadrature video signals $I_{video}$ AND $Q_{video}$ which are conventional with most pulse doppler search radars. The signals from receiver 22 are applied to a hybrid range gate and correlator drive unit 24 which provides drive signals for a correlator/ doppler direction unit 26 at its output. The signals from hybrid range gate and correlator drive unit 24 convey the I and Q doppler shift and doppler direction information which, when processed by the correlator/doppler direction unit 26 results in signals therefrom indicating the presence of targets having a radial velocity within a predetermined range of radial velocities. This information may be displayed in any conventional manner by display unit 28. Display unit 28 may also display range and bearing as with a Plan Position Indicator (PPI) whose cycle commences when the receiver is turned on, and which displays the target when correlation occurs along with its bearing.

Moreover, while not described in detail herein, the spectral signiture from the return of the target may be processed by the matrix correlation techniques described herein and this spectral information can then be displayed at display 28. Additionally, because of the unique phase coding on the pulse doppler signal from a given transmitter, returns which result in a positive correlation automatically indicate that the return is from the particular transmitter having the unique phase coding. Thus, if multiple search radars are operating in one location, returns from a particular radar may be easily identified while those returns from other transmitters are rejected.

The subject search radar system varies from prior art pulsed doppler radar systems both in the use of phase coded signals and in the various elements which make up the search radar. Most important of these are the particular correlation and doppler direction matrices which are passive in nature and which permit extremely high speed processing. The extremely high speed processing is also a function of the data storage and driving circuits for the correlator-doppler direction unit and the particular method of determining the range of a target by the passive decoding of the video signals. In addition the sequential unblocking of the drivers is provided permitting detection of target returns which are partially eclipsed by the radar transmitter pulses.

Passive identification of targets is achieved by the high speed processing which permits very wideband or fine range resolution and simultaneous doppler resolution. The fine range resolution permits individual detection of the major scatterers of a single target along with this doppler spectrum. This combined picture is unique for each type of aircraft.

In operation, the subject search radar scans a given sector for targets. The target may either be stationary (ground search) or may be approaching or receding in a predetermined range of velocity (air search).

In order to aid in the understanding of the entire system, signal synthesizing and correlation will be discussed first followed by a discussion of the particular capacitor matrix correlator. This will be followed by a background discussion of the doppler direction algorithm and a discussion of the summing and thresholding network utilized in extracting this information. Finally, a description of the phase coding system will be presented, with emphasis on the passive decoding networks utilized in obtaining range information. Each of these discussions will be accompanied by an appropriate subheading.

b. Capacitor Matrix Correlator

Figure 2:
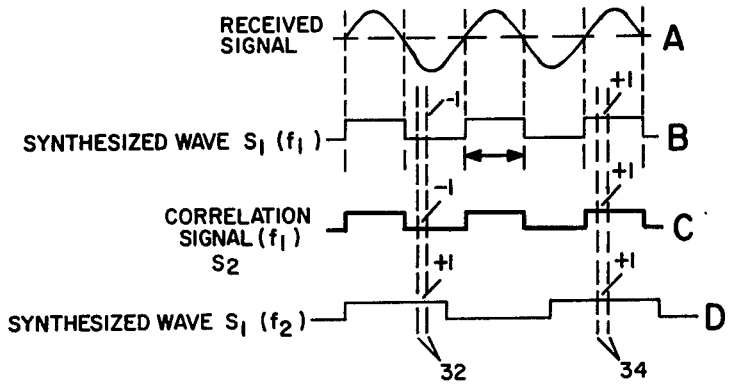
FIG. 2 is a series of waveform diagrams illustrating wave synthesization and correlation.

Before going into the description of a capacitor matrix correlator a brief review of the correlator function as it applies to the recognition of periodic signals is presented. Referring to FIG. 2, the received signal may take the form of the sinusoidal waveform illustrated by waveform A. By hard limiting techniques which are known in the prior art a pulsed waveform such as that illustrated by waveform B may be synthesized such that this pulsed waveform represents a sinusoidal signal having a frequency $f_i$. It is the function of the correlator to ascertain whether this signal is the "same" signal as a correlation signal stored in the correlator, e.g., does the input signal have the same frequency as that of the signal stored in the correlator. A typical correlation signal having a frequency $f_i$ is illustrated by waveform C. As illustrated when both of these waveforms are in phase then these two waveforms exhibit a 100% correlation. How a 100% correlation is recognized is now described.

Assuming that each of the signals represented by waveforms B and C are divided up into segments, correlation is indicated when the values of the two signals in each segment have the same sign. With this method, signal C is effectively multiplied by signal B for each segment. If the result is positive then there is a positive correlation for the given segment. Thus, if in a given segment there are two positive going signals, the multiplication is positive. If there are two negative going signals the result is positive. But if there is a positive and a negative signal within the segment the resulting multiplication is negative. The sum of the segments gives the correlation factor over a number of samples. The sum of the segments will be at a maximum when there is 100% correlation.

For example, let us assume that all positive going signals have a value of +1 and all negative going signals have a value of −1. Then for all segments having either all positive or all negative signals B×C=+1. Assuming 20 segments, 100% correlation = 20. This is equivalent to multiplying the synthesized wave $S_1$ with the correlation signal $S_2$ and integrating.

Thus, when $\int S_1 \times S_2 = $ max., 100% correlation is indicated. Correspondingly, for a synthesized wave having a frequency $f_2$ different from $f_1$, e.g., waveform D, $\int S_1 \times S_2$ would be less than maximum because, for instance, a segment illustrated as being bounded by the dotted lines 32 would produce a product of −1. Thus, while there would be certain segments (c.f. the segment bounded by the dotted lines 34) where the product would equal +1, there would be other times when the product would equal −1. When the products at all the segments are summed, the result would be less than the result arrived at when the synthesized wave exactly corresponds to the stored correlation signal, e.g., 20.

Figure 3:
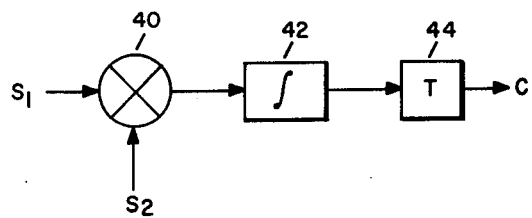
FIG. 3 is a block diagram illustrating the correlator function.

By setting an appropriate threshold all sums under the predetermined threshold can be ignored as involving a signal which dos not sufficiently correlate with the chosen signal. It will be apparent, therefore, that correlation may be implemented by a multiplier and an integrator. This is illustrated in FIG. 3 by the multiplier 40 and the integrator 42. Also shown is a threshold circuit 44 which functions to recognize a predetermined integration level and thus a predetermined degree of correlation. It is the function, therefore, of the capacitor correlator matrix to be described to perform the multiplicative function and the integration function, with the thresholding being accomplished by conventional threshold circuits.

Figure 4:
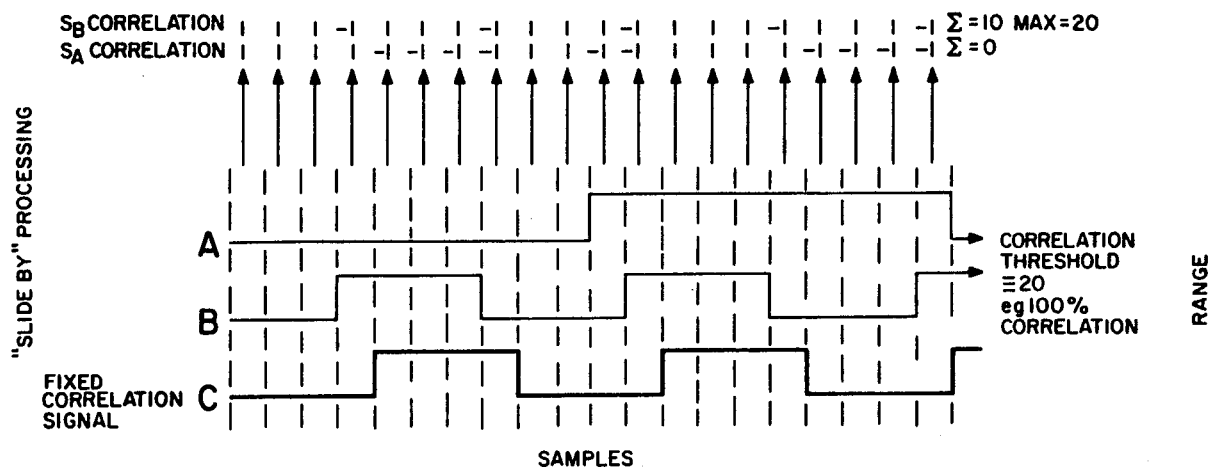
FIG. 4 is a waveform diagram illustrating correlation by the "slideby" processing method.
Figure 5:
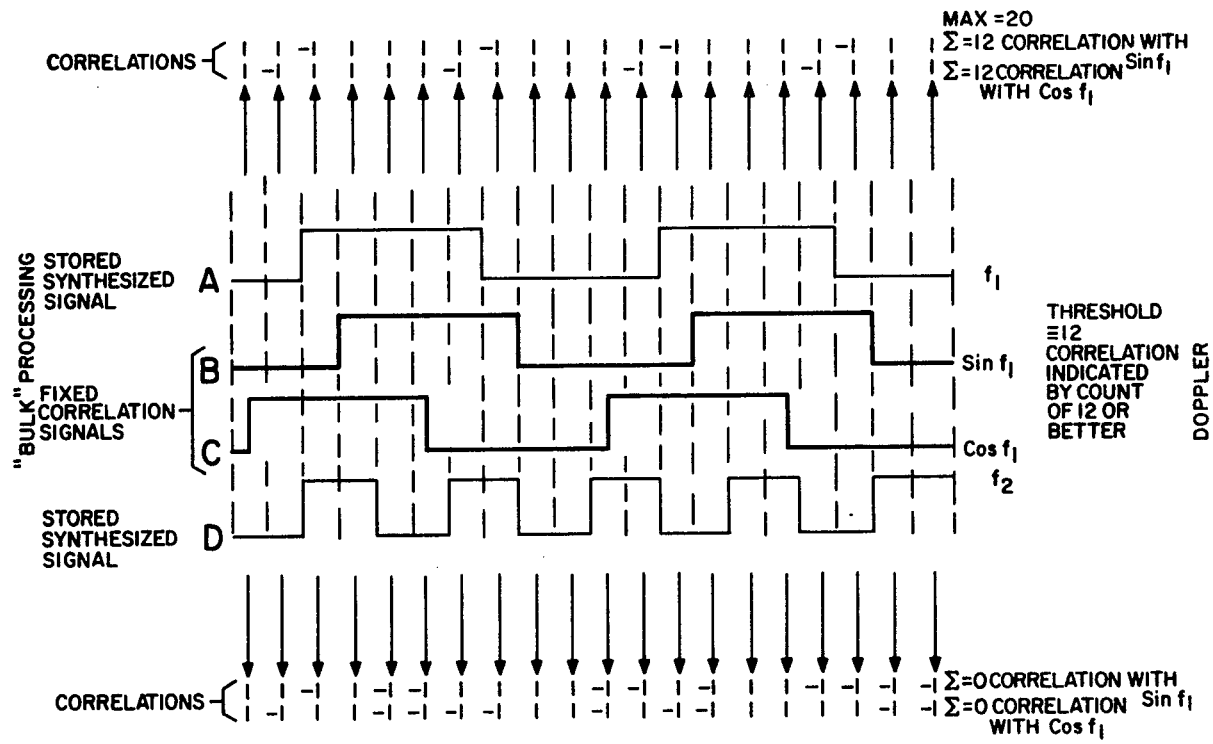
FIG. 5 is a waveform diagram illustrating correlation by the "bulk" processing method.

To continue with the discussion of methods of correlating, as illustrated in FIGS. 4 and 5 there are two methods by which a synthesized signal may be correlated with a stored signal, e.g., the "bulk" processing method, and the "slideby" processing method.

Referring now to FIG. 4, the slideby processing method is described. Assume the storage of a fixed correlation signal illustrated by waveform C of FIG. 4. To this signal we compare a signal illustrated by waveform B which has the same frequency as that represented by the waveform C signal. At the point in time illustrated in FIG. 4, waveform B is slightly out of phase with waveform C. Waveforms B and C are subjected to sampling at 20 different points. If there is a positive correlation between the signals at any one of these points the correlation is indicated by a +1. If there is no correlation at any one of these points the correlation is indicated by a −1. In this particular type of correlator, if there is complete correlation, the sum of the segments would equal 20 since there will be 20 +1 products. In the case illustrated in FIG. 4 with respect to the BC correlation, there are 15 +1 and 5 −1's yielding a net sum of 10. The maximum is 20 and therefore at this point in time there is a 0.5 correlation between the fixed correlation signal and the synthesized signal.

However, as the signal represented by waveform B progresses to the right, there will be a time at which the correlation between waveform B and fixed correlation signal C will result in a sum of 20. Waveform B is therefore said to slide by the fixed correlation signal C such that if the slideby signal has the same frequency as the fixed correlation signal, then at some point in time during the slideby, there will be a maximum correlation of 20. If the threshold is set at 20 then when the threshold detector generates an output signal, it indicates that a synthesized signal having the same frequency as the fixed correlation signal exists.

Referring now to waveform A it will be appreciated that the frequency of waveform A is different than that of waveform C. At the particular point of time illustrated in FIG. 4 there are 10 positive correlations (e.g., 10 1's) and 10 no correlations (e.g., 10 −1's) yielding a sum of zero. No matter how the signal represented by waveform A is shifted with respect to the fixed correlation signal, the summation will never equal threshold 20 and therefore at no point in time will there be an output from a threshold detector set at 20.

While the slideby processing method is useful in certain situations, such as the determination of range as will be described hereinafter, there is another system which does not involve the moving of the signal to be correlated past the correlation signal in the manner just described. This second method is called the bulk processing method and basically involves the storage of the synthesized signal as well as the correlation signal. If the stored synthesized signal happens to be in phase with the stored correlation signal, then the correlation is much like the slideby method previously described. However, it is not necessary for the stored synthesized signal to be in phase with the stored correlation signal in order to determine correlation. This will be seen by inspection of the waveforms of FIG. 5.

Turning now to FIG. 5, assume a correlation signal having a frequency $f_1$. Then by providing two fixed correlation signals, (e.g., waveforms B and C) having respective phase relationships $\sin f_1$ and $\cos f_1$, no matter what the particular phase of a signal having the same frequency as those to which it is to be compared; the sum of the segments can never be less than the sum associated with 100% correlation by more than some fixed amount. In the case of periodically varying signals this is 0.707 × the sum at maximum correlation. The reason that the sum will never be less than the above mentioned fixed amount is because the synthesized signal will be in phase with either of the waveforms B or C or will not be sufficiently out of phase with either of these signals to produce a sum of the segments less than 0.707 of the sum derived when it turns out that the synthesized signal is exactly in phase with either waveform B or C.

For example, as illustrated in FIG. 5, a stored synthesized signal having a waveform A is illustrated as not being in phase with either of the fixed correlation signals illustrated by waveforms B or C. However, this signal has the same frequency as that of the signals represented by waveform B or C. Referring to the top of the diagram the correlation between waveform A and fixed correlation signals B and C are illustrated by the +1; −1 coding method described hereinbefore. As can be seen, the sum of the samples is twelve in each case. Let us assume that this corresponds to a worse case situation, e.g., that the signal having the waveform A is out of phase the most it can be with respect to either one of the two fixed correlation signals. Thus, by setting the threshold equal to twelve, if the synthesized stored signal when sampled at the twenty points results in the summation equal to twelve or greater correlation has been established.

For a stored synthesized signal D having a frequency $f_2$ different from $f_1$, it can be seen that the correlation of this signal with the signal represented by waveforms B and C is very low, e.g., in the illustrated case the correlation is zero depending on which waveform, B or C, the signal D is compared with. Thus, the system described is effective for discriminating against signals having frequencies different from that of the desired correlation signal. It will be appreciated that if the threshold is exceeded either on the $\sin f_1$ line or the $\cos f_1$ line, this is an indication that a signal has been received having a frequency $f_1$. In the aforementioned pulse doppler radar situation a doppler shift of this frequency can thus be recognized.

Figure 6:
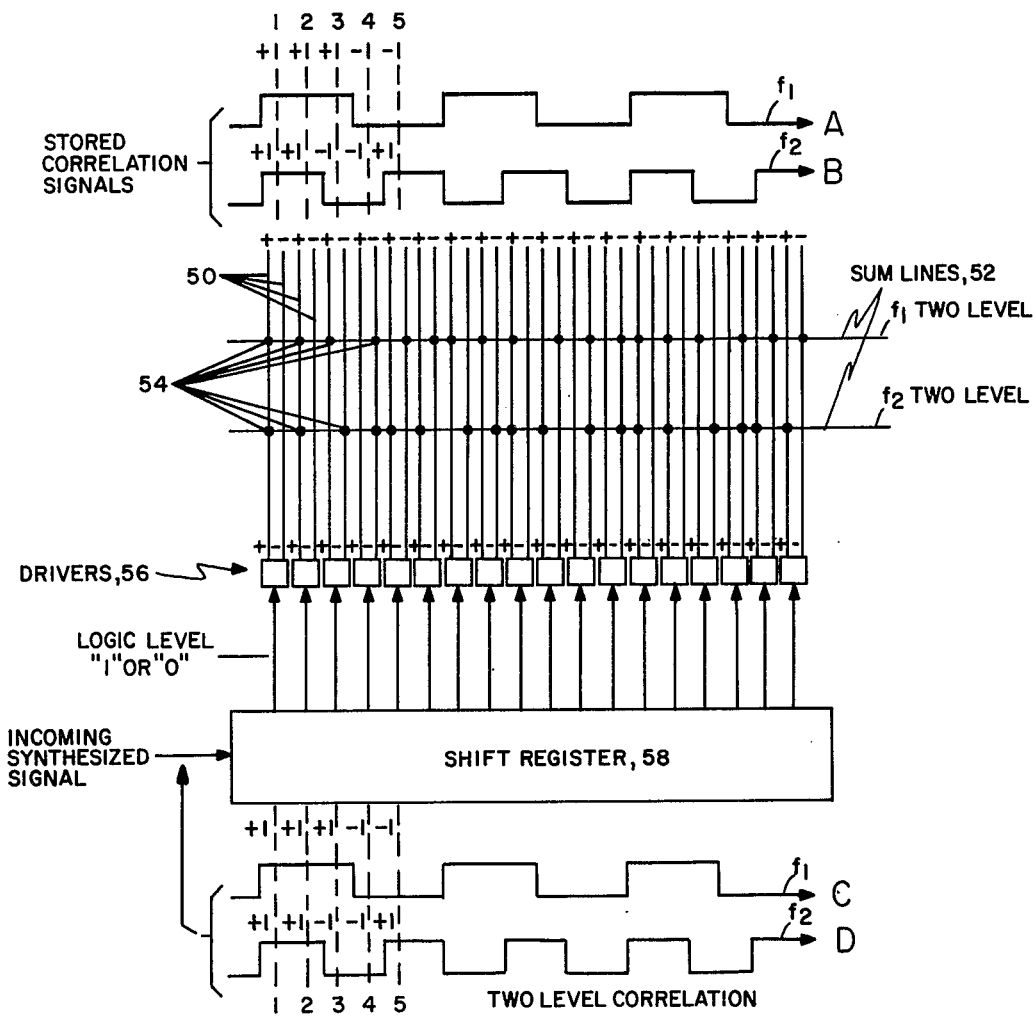
FIG. 6 is a combined waveform and block diagram illustrating a matrix comparator with selected cross-points on a given sum line corresponding to a stored two-level signal.

How this type coding system is implemented in a correlator is now described. Referring now to FIG. 6, a correlator and drive circuitry is illustrated diagramatically. Because of the coding indicated by the black dots, the correlator recognizes an incoming pulse train having a predetermined frequency or pulse repetition rate. The system described in connection with FIG. 6 has the characteristics of the aforementioned slideby system. While the coding system of FIG. 6 will be described for the slideby case, the bulk processing equivalent will be described in connection with FIG. 17.

In this embodiment pulse trains having waveforms A or B are correlated with incoming pulse trains illustrated by waveforms C and D. Waveforms A and B, having pulse repetition rates or frequencies $f_1$ and $f_2$ respectively, are effectively stored by virtue of the coding of the matrix comprised of vertical columns 50 and horizontal summing buses or rows 52. The coding to be described is a result of coupling between selected columns and rows with the coupling being noted in this case by the dots 54 which occupy the intersection between a column and a row. The columns are driven by drivers 56 which, when a logic level 1 signal is present in a corresponding section of a shift register 58, produce a positive voltage of a predetermined value on one of the pair of columns and a negative voltage having the same predetermined value on the other of the pair. The arrangement of voltages on the pair of columns is reversed for a logic level 0 signal in a corresponding segment of shift register 58.

The synthesized incoming signal is shifted down the shift register 58 such that at any given time a segment in the shift register either has a logic level 1 or 0 output depending on the portion of the input signal which resides thereat. For instance, as can be seen by inspection of waveforms C and D the first segment of the shift register (e.g., segment No. 1) contains a logic level 1 output for either waveform C or waveform D at the particular point in time illustrated in FIG. 6. For segment No. 2 the same condition applies in that for the application of either waveform C or waveform D, a logic level 1 signal exists at the output of segment No. 2 of the shift register. With respect to segment No. 3, waveform C is still positive and therefore the output of this segment of the shift register is at a logic level 1. However, in the case of waveform D, the waveform has gone negative and therefore the output of the shift register is a logic level 0.

Taking for example stored waveform A, and the top sum line illustrated it will be apparent that for the first segment, e.g., segment No. 1, the desired correlation waveform has a +1 value indicating a positive going waveform, this +1 voltage will appear on the "plus" column. In order to recognize the +1 value an interconnection point is established on the plus column from the driver corresponding to segment No. 1, and the voltage on the plus column is transferred to the summing bus. There is no interconnection point on the minus column corresponding to segment 1, since it makes no difference to the correlation what voltage is on this minus column. The situation for segment No. 2 is the same, and also for segment No. 3 since the waveform to be stored is positive at these segments. At segment No. 4, however, the incoming synthesized waveform goes negative and the polarity of the driving voltage on the segment 4 plus column is reversed such that a + voltage now appears on the minus column. Therefore, an interconnection point is placed on the minus column associated with segment No. 4 to recognize a negative going portion of the incoming synthesized waveform. The same is true for segment No. 5.

The correlation between an incoming signal and this particular coded arrangement takes place as follows. If the signal is in the position shown by waveform C, then the output on the plus column from the driver associated with segment No. 1 will be positive and the driving voltage on this plus column is therefore connected or coupled to the top summing bus. Likewise, for segment No. 2, the driver produces a positive voltage on the plus column and this too is connected or coupled to the top summing bus. The same is true for segment No. 3. In segment No. 4 the shift register has a logic level 0 signal at its output indicating a negative going portion of the incoming signal. This logic level 0 signal is coupled to the driver associated with segment No. 4 which switches the polarity of the voltages carried by its columns and produces a positive voltage not on the plus column but on the minus column. This is also true for the segment No. 5 situation. Since the minus columns are coupled to the top summing bus for segments 4 and 5, and since due to the logic level 0 signals in the shift register the polarity of the voltages on corresponding drivers are revised, additional positive voltages are applied to the top summing bus. At this point there will be 5 positive voltages applied to the top summing bus such that the voltage on the top summing bus is equal to 5 times a single applied voltage. If the correlator were only 5 segments long, then a positive correlation between the waveform C signal and the waveform A signal would be 5 times the voltage level on the sum line due to one coupling. A threshold circuit at the end of the top summing bus would therefore recognize when a 5 level signal appears on the summing bus and would produce a signal indicating the presence of an incoming signal having the same frequency and waveform as the stored waveform A. The coding of the column lines then assures that when an input signal arrives having the selected frequency, all of the columns that have positive voltages as a result of the incoming signal will couple their voltages to the summing bus. Conversely, the system would work equally well with all negative voltages being summed.

Referring to the lower summing bus, it will be appreciated that the waveform B is stored in the matrix in the same manner that waveform A was stored. For instance, for the first segment the desired waveform should have a positive going segment and therefore the plus column from the segment No. 1 driver is coupled to the lower summing bus. This holds true for segment No. 2. However, for segment No. 3 the desired waveform has a negative going segment. Therefore, the negative column corresponding to segment No. 3 is coupled to the lower summing bus. This is true for segment No. 4 as well. At segment No. 5 the desired waveform again goes positive and the positive column corresponding to segment No. 5 is coupled to the lower summing bus. In the same way, a signal such as waveform D when it arrives in the position shown results in the following voltages being applied to the lower summing bus: with respect to segment No. 1 the segment No. 1 driver applies a positive voltage to the plus column since the shift register will have a logic level 1 output at its segment No. 1 output terminal. At this point it will be noted that there will also be a negative voltage on the minus column corresponding to segment No. 1. However, this voltage is not coupled to the lower summing bus since there is no interconnection means at the cross points between the minus column and the lower summing bus. Going to segment No. 2, the output of the segment No. 2 portion of the shift register is at a logic level 1, thus producing a positive voltage on the plus column and a negative voltage on the minus column. However, since the negative column line is not coupled to the lower summing bus it has no effect. The opposite situation applies for segments No. 3 and No. 4 with the result being a voltage on the lower summing bus equal to 5 as described in connection with top summing bus. In this manner, incoming signals as they are shifted down the shift register produce an output on the summing bus which grows to a threshold indicating coincidence and therefore correlation between the incoming signal and the stored correlation signal.

It will be appreciated that the pulse waveform stored in the matrix in this manner is a two-level waveform in which the value of the stored waveform is either +1 or −1.

Figure 7:
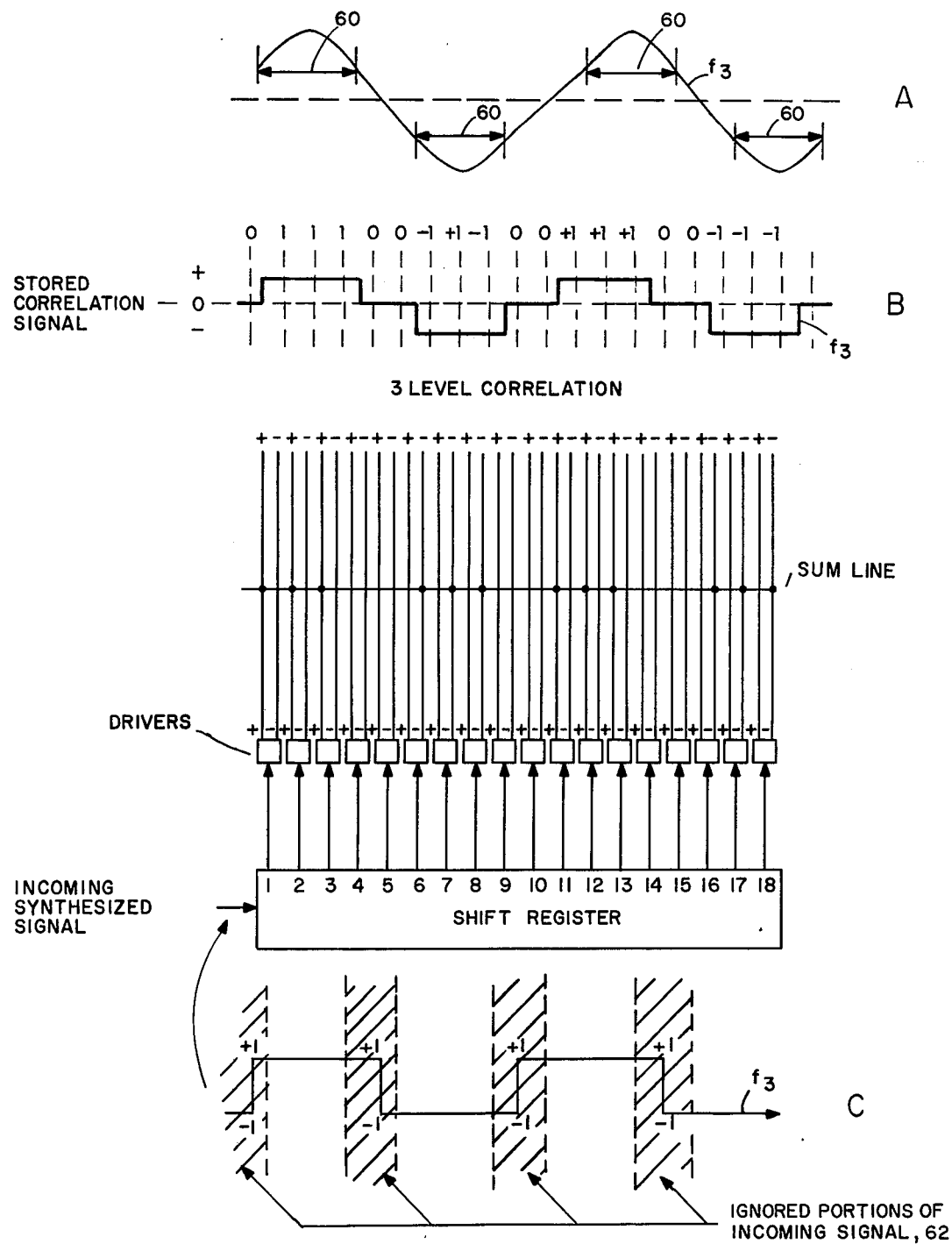
FIG. 7 is a combined waveform-schematic diagram illustrating a three-level correlation system in which an incoming signal of a two-level variety is compared to a three-level replica of a sine wave stored in the correlator.

Referring now to FIG. 7, a sinusoidal waveform A is presented which is approximated by a three-level waveform B. The purpose of the approximation of a sine wave with a three-level as opposed to a two-level waveform is to prevent the effects of noise on an incoming signal from effecting correlation to the desired waveform. As mentioned in U.S. Pat. No. 3,548,383 noise occuring on an incoming signal disrupts detection of the signal most seriously at the point where the signal crosses a zero axis or changes polarity. Since one major feature of the subject invention is the ability to detect a sine wave from a very noisy signal, it is important to be able to ignore that portion of the incoming signal at which noise is likely to produce false indications of the desired waveform.

Noise occurs randomly and can contribute substantially to the amplitude of a detected signal anywhere in time. When the incoming signal amplitude is close to the zero axis, noise may cause the incoming signal to dip below or rise above the zero axis at times other than when the desired signal actually moves across the zero axis. When zero crossover detectors are used in generating the aforementioned synthesized input signal, false zero crossings caused by noise prohibit accurate synthesizing.

It will be appreciated that noise occuring when the desired wave is away from the zero axis is not likely to cause the desired incoming signal to cross the zero axis at the wrong time. It is therefore important to ignore those portions of the incoming signal at or about the expected zero crossover. In order to ignore the portion of the signal most affected by noise, portions of the signal approximately 30° to each side of an expected crossover are ignored. What this means in terms of waveform A is that only those portions of the incoming signal designated by the arrows 60 are sampled by the subject system. It is these segments of the sine wave which are least effected by the noise since the contribution of the noise will not likely take that portion of the sine wave above or below the zero crossing axis. It will be appreciated that between the regions designated by the arrows 60 there is a zero crossover at which point noise may take the waveform above and below the zero crossing axis indiscriminately. Therefore, in this region detecting the incoming signal would result in false representations of the signal. However, in the regions designated by the arrows 60, random noise will not likely cause the signal to go from one side of the zero axis to the other. It is therefore this information which is more reliable.

In order to code or program the correlator to ignore the sections of the input signal between the regions designated by the arrow 60, the correlator is programmed or coded in accordance with waveform B such that for the first three shift register segments, since a positive going wave is expected, the plus column for each of the associated drivers is coupled to the summing bus. For segments No. 4 and No. 5 of the shift register which lie within the prohibited region ± 30° of the zero crossing there is no interconnection between the driver columns and the summing bus. For segments No. 6, No. 7, and No. 8 of the shift register the minus columns of the drivers associated therewith are coupled to the summing bus as before. This pattern is repeated as indicated.

The coding of the correlator is such that it will recognize a sine wave (such as that indicated by waveform A) by the three-level approximation scheme illustrated by waveform B. When an incoming signal, as indicated by the two-level waveform C passes down the shift register, the system ignores portions 62 of the incoming signal due to the particular coding within the correlator. It is these portions of the incoming signal which correspond to the zero crossover portions of the sine wave synthesized by the two-level approximation (e.g., waveform C). Thus, the most troublesome noisy portions of the signal are eliminated from consideration by the correlator matrix.

As shown, with the waveform C in the position indicated with respect to waveform B, 100% correlation can be expected. This is true because the frequency or pulse repetition rate of waveform C is identified to that of both waveforms A and B. Here waveform C is generally in phase with waveform B at the moment of time depicted. How the correlator is implemented to perform these functions is now described.

c. Capacitor Correlator Matrix Configuration and Operation

Figure 8:
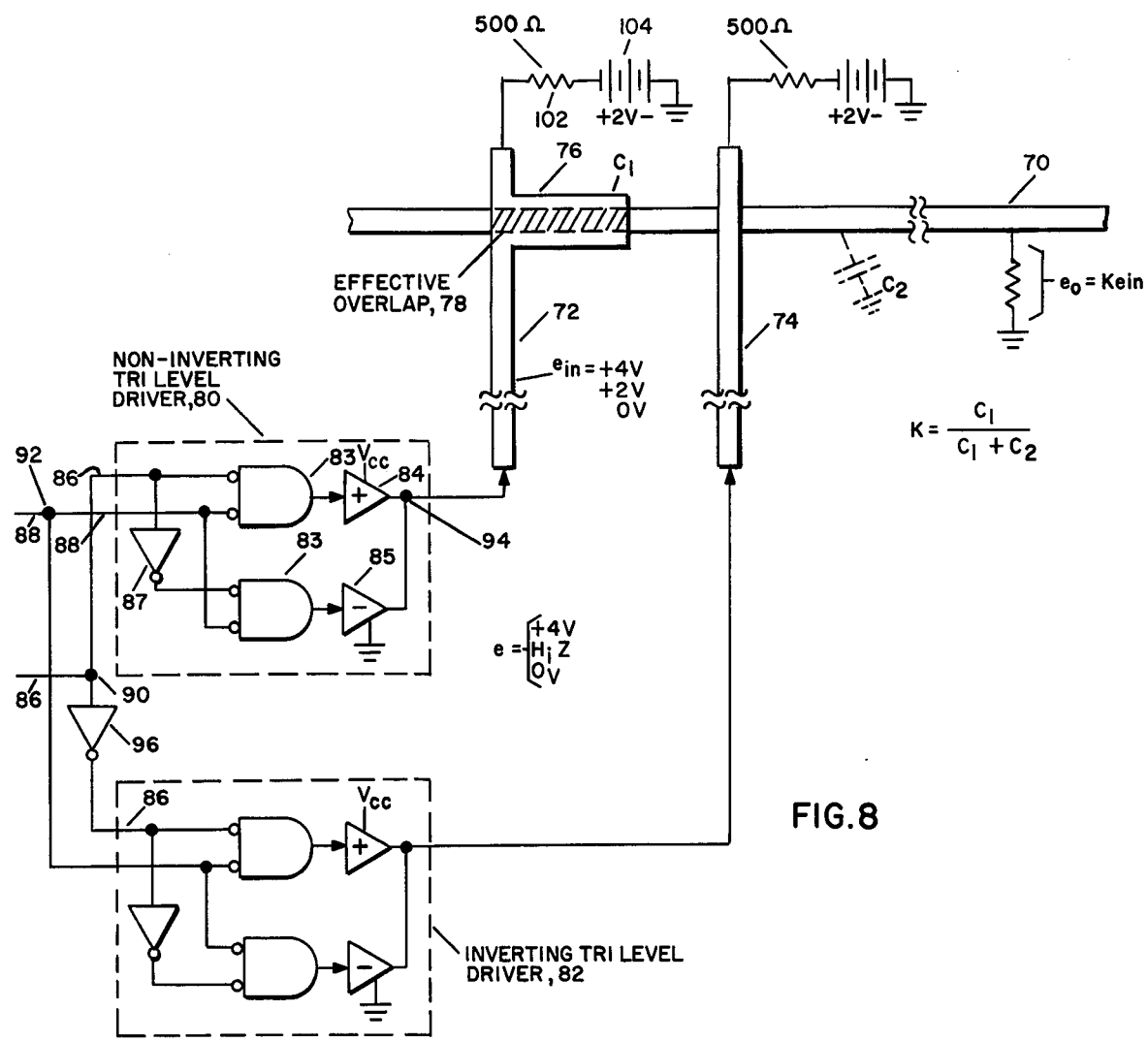
FIG. 8 is a diagramatic representation of a single cross point in a capacitor matrix correlator and a schematic diagram of a three-level driver therefor.

Referring now to FIG. 8, a portion of the summing bus 70 is illustrated as crossing under columns 72 and 74. Appended to column 72 is a laterally extending tab or flag 76 which overlaps a portion of summing bus 70 as indicated by the dotted shading 78. This overlapping construction forms a capacitor having a capacitance $C_1$ which depends upon the extent of overlap and the spacing between tab 76 and summing bus 70 as well as the dielectric therebetween. It is, therefore, capacitor coupling which couples voltages from column 72 through the capacitor and on to the summing bus 70. The voltages applied to column 72 are illustrated as $e_{in}$ = +4 volts, +2 volts and 0 volts, with the +2 volt level defining the 0 level for the system. It will be appreciated that in a capacitor coupled system, it is only the rising portion of an applied voltage pulse which is transmitted to the summing bus such that for a constant 2 volts applied to column 72, the voltage on summing bus 70 at least in the steady state is essentially at zero. With column 72 initially existing at the two volt level, the application of four volts to this line will cause a 2 volt pulse or spike to be coupled to summing bus 70. Likewise, the reduction of the voltage on column line 72 from 2 volts to 0 volts results in a negative 2 volt excursion on summing bus 70. Considering column 72 to be the plus column as described hereinbefore, and column 74 to be the minus column, then for a logic level 1 signal from a shift register (not shown in this FIG.) $e_{in}$ for column 72 would be 4 volts and $e_{in}$ for column 74 would be 0 volts. This situation would be reversed for a logic level 0 signal from the aforementioned shift register.

It will be appreciated that the output voltage will rise to an $e_o = Ke_{in}$ where $$K = \frac{C_1}{C_1 + C_2}.$$

Here $C_2$ represents stray capacitance between the sum line and ground. Thus, the output voltage, $e_o$, is proportional to the input voltage as coupled across capacitor $C_1$. With no tab portion on column 74, e.g., a "skip", the effective capacitive coupling between this column and the summing bus is very low, such that voltages on this column will not affect the voltage on the summing bus to any great extent. Moreover, because on each summing bus there exist a number of opposite voltage "skips", the voltages coupled across the skips cancel out such that voltages due to skip capacitance are eliminated.

As mentioned before there is a three level approximation of the sine wave which is coded into the matrix. This should not be confused with the tri-level driver and three-level voltage driving scheme utilized in one embodiment of the subject correlator which will now be described. The three-level driving system is utilized to enable inhibiting of all of the columns driven by a particular driver. For purposes of this description "inhibiting" refers to the application of a steady state 2 volt potential on the columns. This gives the subject system the ability to inhibit coupling of signals to the summing bus of the capacitor correlator matrix. The necessity of inhibiting will become apparent in the discussion of the hybrid range gating system discussed in connection with FIGS. 19–28.

For the present it is sufficient to note that each of the drivers illustrated in the preceding figures in actuality may be composed of two tri-level drivers, here illustrated at 80 and 82. Tri-level driver 80 is a noninverting driver whereas tri-level driver 82 is an inverting driver, there being an inverter 96 coupled into the input line of driver 82. Each of these drivers has an input line 86 and an inhibit line 88, interconnected at terminals 90 and 92, respectively.

In general the tri-level drivers 80 and 82 may be understood as each being comprised of two AND gates 83, each having two inverting input terminals. The outputs of these AND gates are connected respectively to positive and negative drivers 84 and 85 having output terminals interconnected at a terminal 94. The data input line, illustrated here by the reference character 86 is connected to one input terminal of one of the AND gates and through an inverter 87 to one input terminal of the other of the AND gates. Inhibit line 88 is coupled to the other input terminals of each AND gate.

Figure 9:
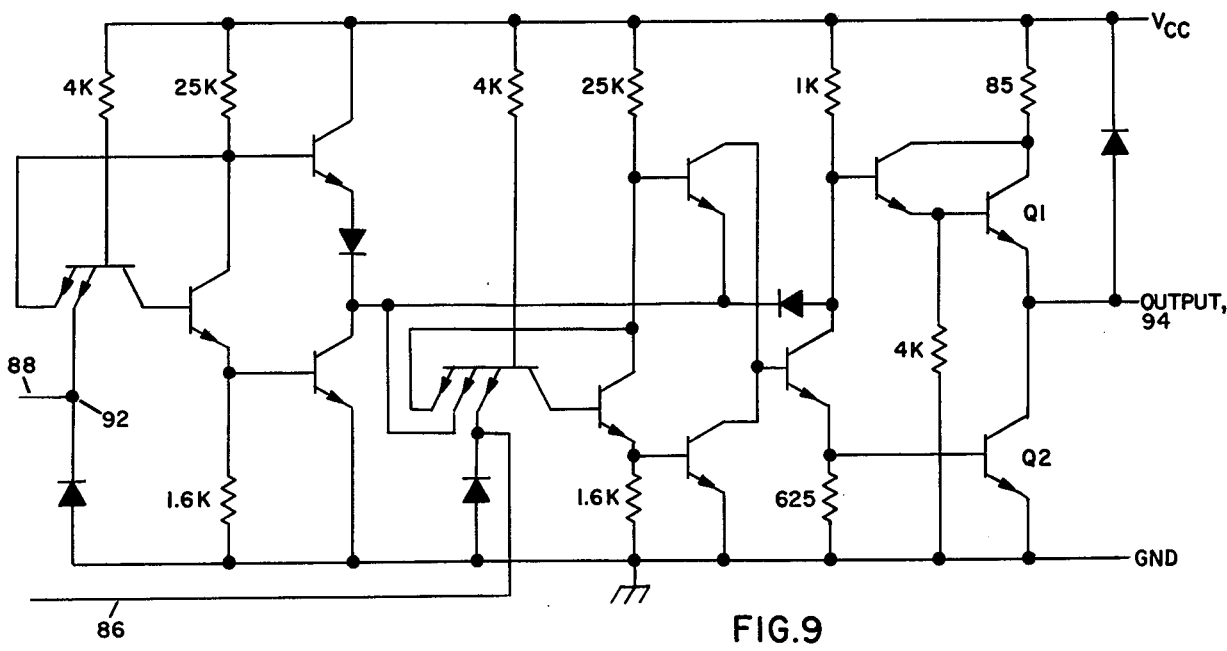
FIG. 9 is a schematic diagram of one circuit implementation for the three-level driver of FIG. 8.

In operation, in one embodiment a positive or logic level 1 data signal on line 86 causes terminal 94 to rise to $V_{cc}$, while a negative or logic level 0 signal on line 86 causes terminal 94 to be clamped to ground. A logic level 0 signal on line 88 overrides the data signal and causes the drivers to turn off. When this occurs terminal 94 presents a high impedance termination. A circuit which provides the above functions is illustrated in FIG. 9 and is manufactured by Texas Instruments as SR 74125. This circuit in general includes two output transistors $Q_1$ and $Q_2$ connected in series between $V_{cc}$ and ground. For a logic level 1 signal on line 86, transistor $Q_1$ connected to $V_{cc}$ turns ON and for a logic level 0 signal on line 86 transistor $Q_2$ to ground turns ON.

This circuit in one embodiment provides the 4 volt or 0 volt $e_{in}$ signal. Should it be desirable to inhibit the operation of the capacitor matrix, a logic level 0 signal is applied to terminal 92 through line 88 to render drive transistors $Q_1$ and $Q_2$ nonconductive. This provides that terminal 94 is a high impendence termination for its respective column. The other end of the column is connected through a resistor 102 to the positive terminal of a battery 104 which has its negative terminal grounded. This is a 2 volt d.c. power source which supplies 2 volts to the column when terminal 94 presents a high impedance. Otherwise, resistor 102 drops the battery voltage by 2 volts. From the foregoing the following pulses can be coupled to a summing bus:

```
0  → 2v = +2v pulse
2v → 4v = +2v pulse
0  → 4v = +4v pulse
4v → 2v = -2v pulse
2v → 0  = -2v pulse
4v → 0  = -4v pulse
```

Thus, pulses or spikes having 2 voltages, e.g. ± 4 volts, or ± 2 volts may be selectively applied to a column. It will be appreciated that the return to the 2 volt "zero" of the system is done either while the threshold is inhibited during "dead time" or gradually so that this transition is ignored.

The inverting tri-level driver is of the same configuration as the nonconverting tri-level driver with the exception that an inverter 96 is positioned in line 86 to this driver. The resultant voltage applied to column 72 and column 74 is such that for a logic level 1 signal, the noninverting tri-level driver 80 will supply a +4 volt signal to column 72 while, because this logic 1 level signal is inverted at 96 a logic level 0 signal is applied to the inverting tri-level driver. The voltage from the inverting tri-level driver to column 74 will be 0 volts. This situation will be reversed for a logic level 0 signal from the shift register.

Figure 10:
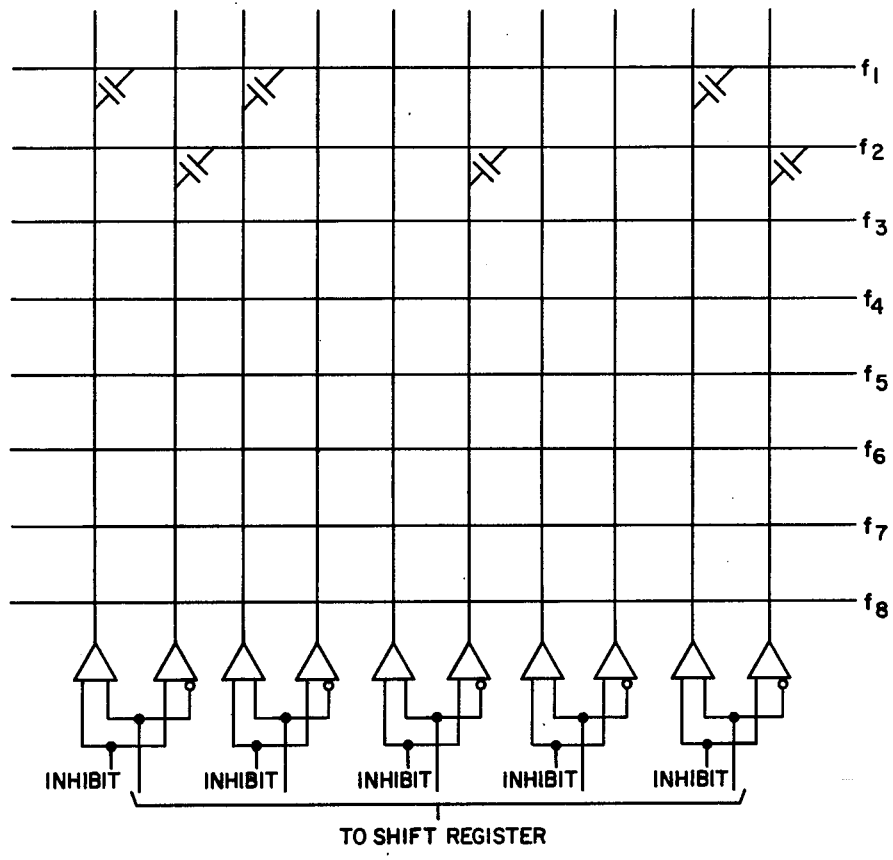
FIG. 10 is a schematic diagram of a capacitor correlator matrix.

As illustrated in FIG. 10, a schematic diagram of the matrix and drivers may take the form shown with each driver being composed of essentially two drivers, one an inverting driver and one a noninverting driver. The matrix is therefore characterized as having a capacitor coupling between various of the vertical columns and the horizontal summing buses as shown.

Figure 11:
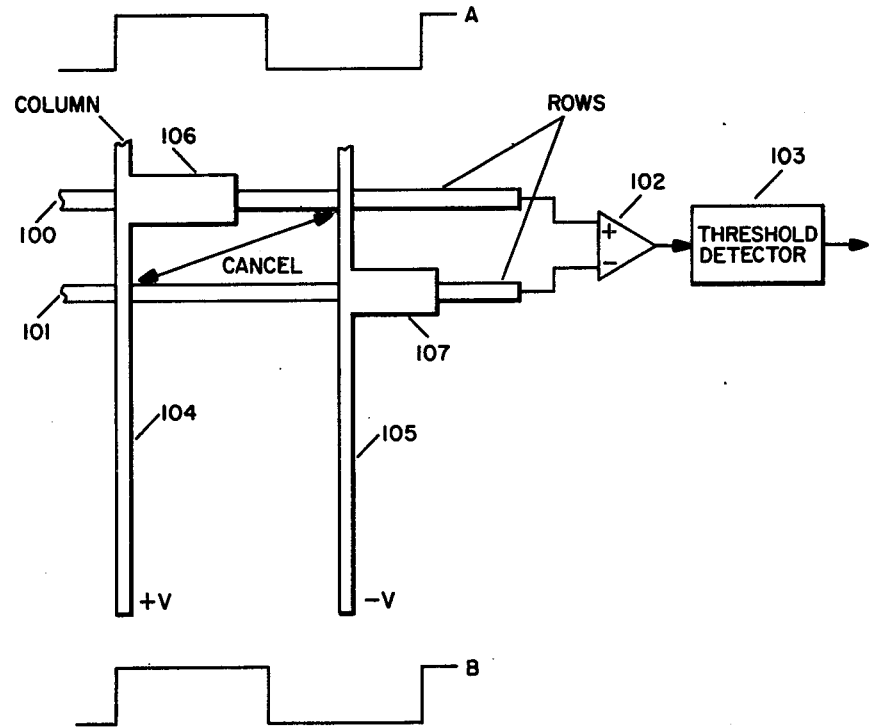
FIG. 11 is a diagramatic representation of a one column /2 row embodiment of the capacitor matrix.

Referring to FIG. 11 it will be appreciated that the same type of coding system can involve the use of a single column and double rows as indicated. In this embodiment two rows 100 and 101 are summed at a differential amplifier 102 the output of which is coupled to a threshold detector 103. Single columns 104 and 105 carry the code tabs 106 and 107 respectively. Should correlation to waveform A of FIG. 11 be desired, column 104 would carry tab 106, as illustrated, which couples column 104 to positive row 100 while column 105 would carry tab 107 with couples column 105 to negative row 101 as illustrated. Should it be desirable to correlate or "slide by" waveform B then it will be appreciated that a positive voltage corresponding to the positive going portion of waveform B would be applied to column 104 while a negative voltage corresponding to the negative going portion of waveform B would be applied to column 105. This results in a positive voltage being coupled to row 100 and a negative voltage being coupled to row 101. The negative voltage coupled to row 101 being applied to the negative input terminal of the differential amplifier 102 is in effect added to the voltage at the positive input such that correlation occurs for a maximum output of the differential amplifier 102.

As before, for the portion of column 104 which skips over row 101 and for the portion of column 105 which skips over row 100 the capacitive effect of the limited coupling is cancelled in the differential amplifier such that the skipped portions have no effect on the subject system. It can thus be seen that whether a double column/single row arrangement is utilized or whether a double row/single column arrangement is utilized suitable coding will permit the recognition of the desired waveform when it is applied to the correlator input.

d. Fabrication of the Capacitor Matrix

Figure 12:
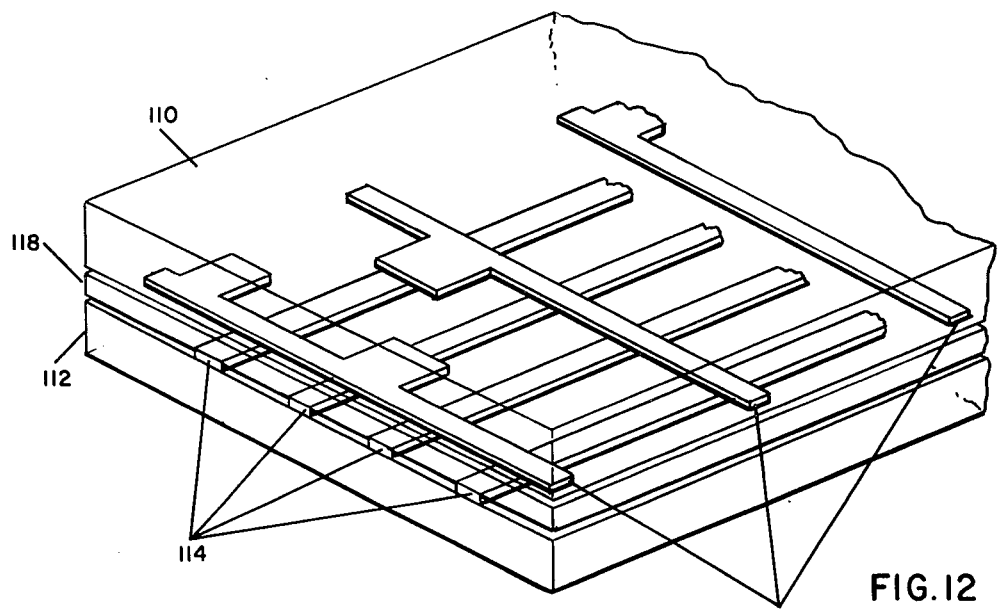
FIG. 12 is a diagram illustrating the printed circuit board fabrication technique for manufacturing the capacitor matrix correlator.
Figure 13:
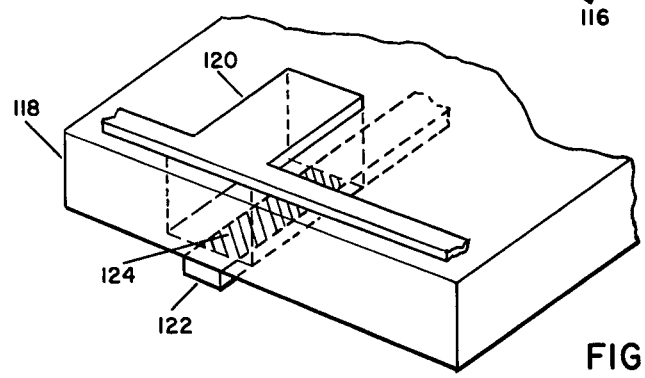
FIG. 13 is a diagram illustrating the overlap between a capacitor tab connected to a column of a capacitor correlator matrix and a sumline immediately therebeneath corresponding to a row of the matrix.
Figure 14:
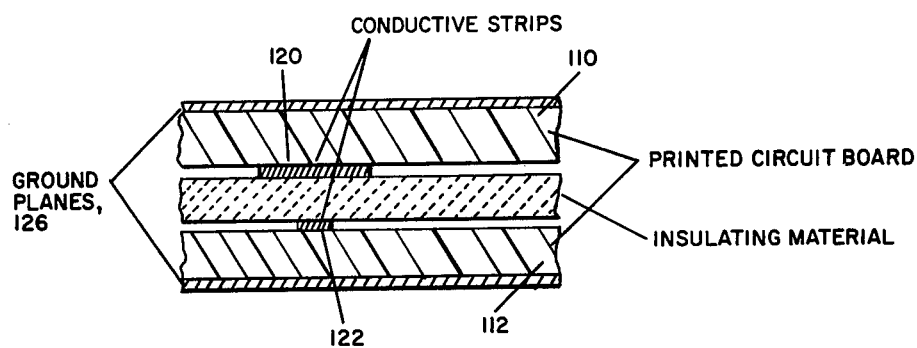
FIG. 14 is a sectional diagram illustrating the relative positions of the printed circuit boards, their respective conductive strips and the insulating material between the circuit boards.
Figure 15:
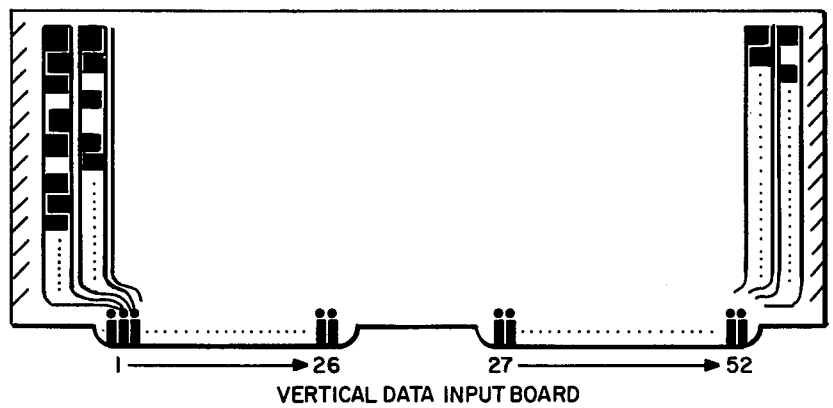
FIGS. 15 and 16 illustrate diagramatically two printed circuit boards utilized in forming the capacitor correlator matrix.
Figure 16:
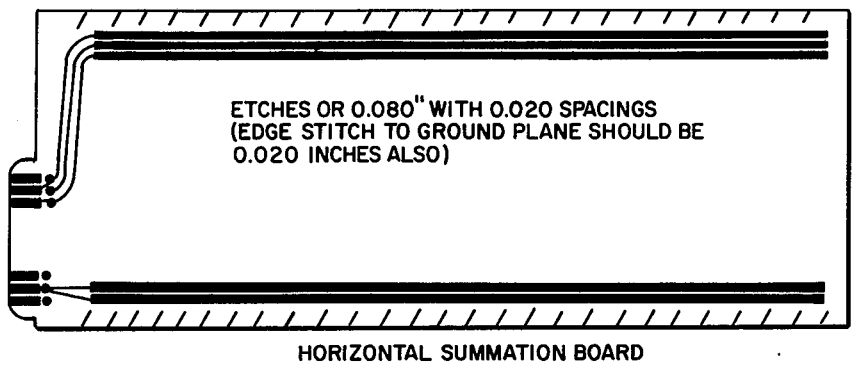
Figure 17:
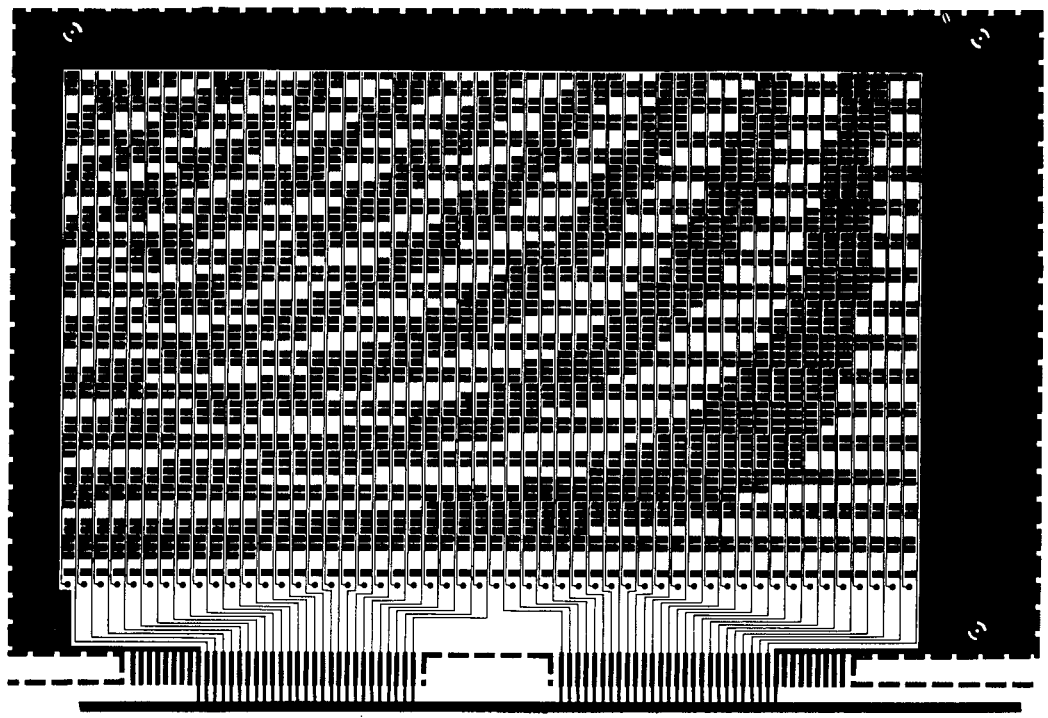
FIG. 17 illustrates the patterning of the circuit board utilized in forming the columns for one embodiment of the capacitor matrix correlator.
Figure 18:
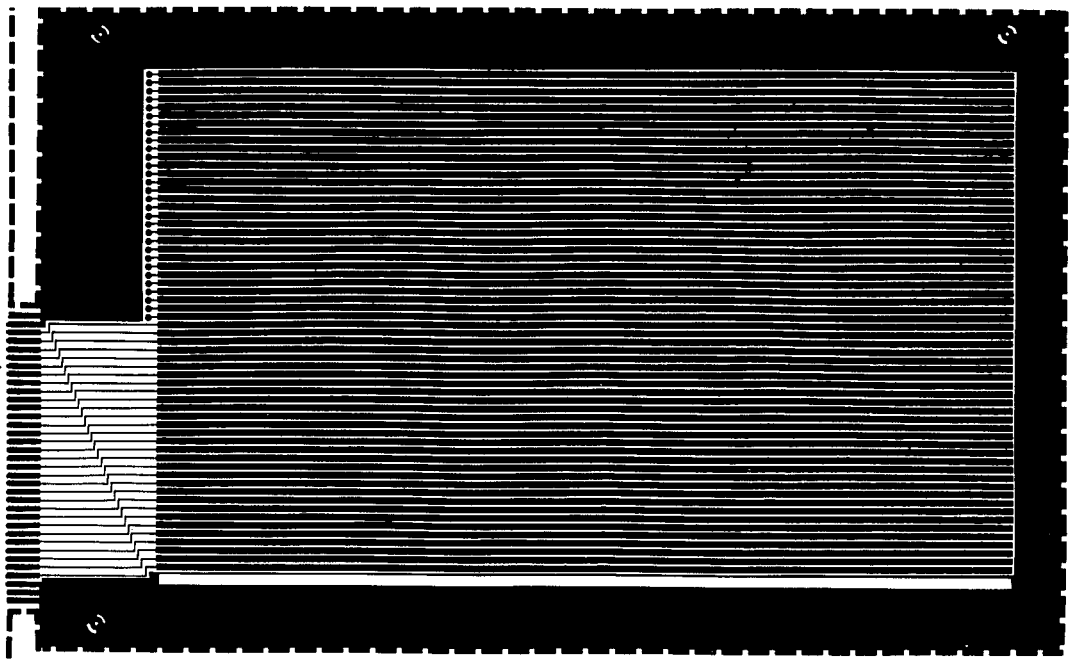
FIG. 18 illustrates the patterning on a second printed circuit board showing the sumline configuration.
Figure 19:
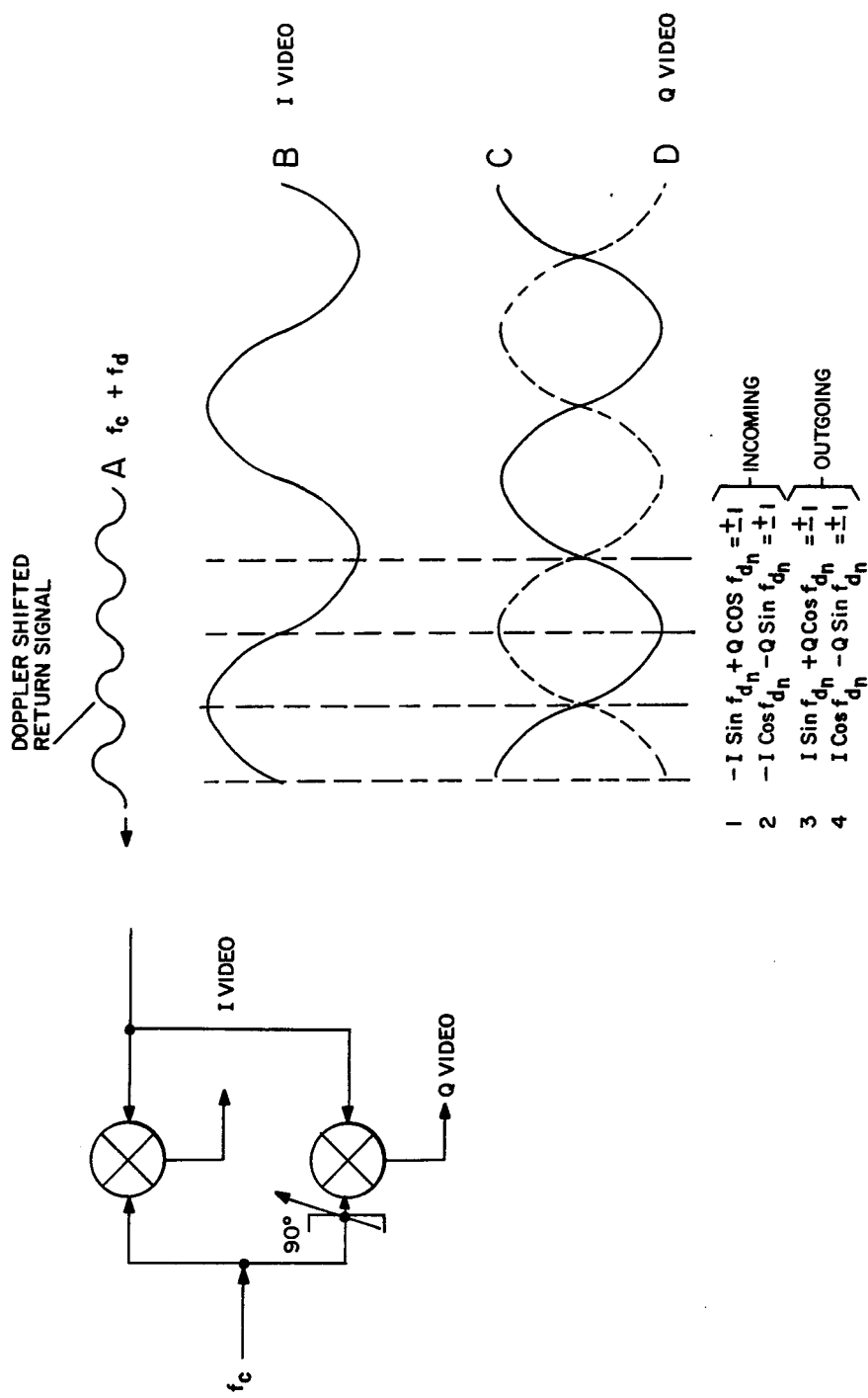
FIG. 19 is a combined block diagram and waveform diagram illustrating the generation of $I_{video}$ and $Q_{video}$ signals for use in determining the doppler frequency shift and doppler direction.

The capacitor matrix in one embodiment may be formed as illustrated in FIGS. 12, 13 and 14 by the sandwiching of a dielectric between two circuit boards 110 and 112 each carrying a patterned configuration of metallic leads on facing surfaces thereof. The summing buses may be patterned onto the top face of circuit board 112 as illustrated by the pattern 114. The columns may be patterned onto circuit board 110 as indicated by pattern 116. These columns are adhered to a facing surface, e.g., the lower surface of the top printed circuit board. Between the two circuit boards is placed a dielectric sheet 118 such that a capacitor as shown in FIG. 11 is formed by a tab 120 on top of the dielectric sheet 118 and a summing bus 122 immediately therebeneath. The effective area of the capacitor is indicated by the shaded portion 124. In cross section, as illustrated in FIG. 14, printed circuit boards 110 and 122 carry ground planes 126 on their outer surfaces. Conductive strip portions 120 and 122 are shown in vertical registration. A diagrammatic top view of the printed circuit board carrying the columns is illustrated in FIG. 15 while the board carrying the summing buses is illustrated diagrammatically in FIG. 16. The patterning and configuration of the board carrying the columns in one embodiment is shown in FIG. 17 while the patterning and configuration of the board carrying the horizontal summing buses is shown in FIG. 18. It will be appreciated that in the configuration shown, all the data dependent information, e.g., coding, is implemented in terms of the patterning of the input printed circuit board, whereas the output printed circuit board carries only summing buses. This permits greatly simplified fabrication. The coding and data for the positioning of the individual capacitors in the master of the matrix is generated by a Fortran program called "stitch". This program generates the three level approximation for both the sine and cosine patterns of a sinewave of arbitrary frequency utilizing an optimum skip angle (in one embodiment) of ±22.5° at the axis crossings (instead of the previously mentioned 30°). The amount of capacitance at desired junctions in the matrix was determined to be such that plates of 0.080×0.155 inches separated by a dielectric produce 3.1 picofarads of capacitance. The width of the plates can be made larger than the width of the sum buses to account for lack of precise registration. Up to ±0.005 inches of misalignment in registration can exist in either the X or Y plane without affecting the active plate area of the capacitor. In order to maintain an adequate coupling for minimum signal amplitudes, the minimum signal amplitude was established by determining the number of active junctions that would be required to exceed the threshold under the worst case, then multiplying that by the contribution of a single junction. A voltage source capable of delivering 5 volts was assumed for the driver, and a load capacitance of 310 picofarads was assumed for the output bus. From considerations not presented here, it was determined that in an 11 bit system, the threshold value would be 0.55 volts. From the point of view of most search radars this is not an uncomfortable level to threshold and therefore the crosspoint capacity value of 3.1 picofarads is acceptable. From theoretical calculations, by essentially sacrificing half of the output voltage swing it is possible to reduce the adjacent coupling to an acceptable level even for systems requiring Moving Target Indicator (MTI) performance.

In the overall configuration in one embodiment 240 horizontal summing buses are contemplated with 312 pairs of vertical columns. A standard double-sided printed circuit board edge connector is utilized on both layers of the matrix requiring the use of plated-through holes. All etched patterns are spaced on at least 0.10 inch centers. The overall matrix is broken down into 24 sections, each containing 60 horizontal summing buses and 52 vertical column pairs. With respect to the vertical columns the conductors are nominally 0.10 inches in width with a separation of 0.15 inches, between one pair and the next, where a pair is separated by 0.175 inches, giving nominal 0.2 inch centers for the pairs. The position of the flags or tabs is different for each of the 24 cards, requiring 24 different overlays. The summing buses for each of the 24 cards are identical.

e. Doppler Direction Matrix

As mentioned hereinbefore, once the doppler shift has been measured there remains the problem of ascertaining whether the target is approaching or receding. By way of background and in connection with FIG. 19, a doppler shifted return signal illustrated by waveform A having a frequency $f_c + f_d$ is returned to a receiver where it is homodyned with the carrier to produce a signal labeled $I_{video}$ illustrated as waveform B. The return signal is also homodyned with a portion of the carrier which has been shifted 90° to produce a signal $Q_{video}$. This is illustrated as waveform D. The algorithm which establishes whether the target is approaching or receding is set forth at the bottom of FIG. 19 such that if either expression (1) or (2) is equal to ±1, the target is incoming or approaching and such that if either expression (3) and (4) is equal to ±1, then the target is outgoing or receding. It can be shown that when expressions (1) and (2) equal +1 or −1 then expressions (3) and (4) will equal 0 or vice versa.

From expressions (1), (2), (3) and (4) it will be appreciated that all the components of these expressions must be available from the correlator matrix if doppler direction is to be determined. How these components are generated is now described.

Figure 20:
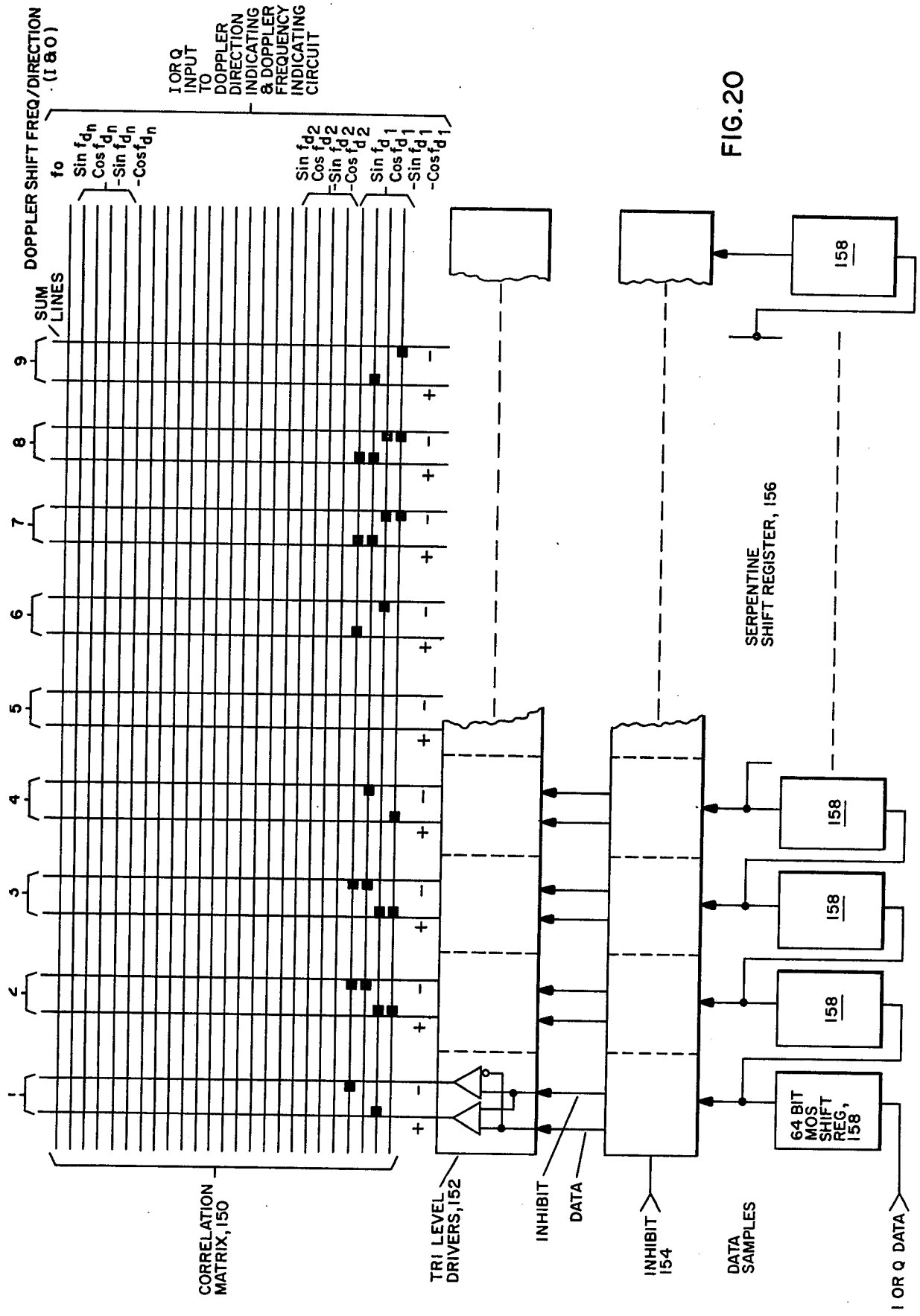
FIG. 20 is a schematic and block diagram illustrating a serpentine shift register feeding tri-level drivers coupled to a capacitor matrix, indicating the provision of sine, cosine, -sine, and -cosine function outputs for use in the doppler direction summing arrangement of FIG. 21.

Referring to FIG. 20, a correlator matrix 150 is illustrated in which for each doppler frequency which is sensed, there are four summing buses with junctions coded such that for a given frequency the summing buses correspond to $\sin f_1$, $\cos f_1$, $-\sin f_1$, and $-\cos f_1$ respectively. While all of these functions may not be used for doppler direction determination, they can be made available as an output of the correlator. As described in connection with FIG. 5, it is possible to pattern the matrix such that the above functions are generated. It will be noted that in generating the −sine and −cosine functions, all that is necessary is to reproduce the patterns for the sine and cosine functions on the corresponding opposite polarity column line as represented pictorally by the coding of the correlator matrix 150.

The correlator matrix 150 is driven by the aforementioned tri-level drivers here assigned the reference character 152. The data and inhibit lines to the tri-level drivers are as labeled, with the inhibit functions being carried out by an inhibit register 154, the function of which will be described in connection with the hybrid range gating system. The tri-level drivers are driven by a shift register which, in this instance is a serpentine shift register 156 made up of a number of 64 bit MOS shift registers 158 connected in series. Each 64th bit is read out of the serpentine shift register at the interconnection point between the registers such that in effect the serpentine shift register 156 is a shift register in which each 64th bit is tapped and read out.

The reason for tapping every 64th bit is that in one embodiment the transmitted signal has two synchronous codes, a high speed 64 bit sequence each word of which is coded by a slow speed code. The input to the serpentine memory is already passively decoded for the fast 64 bit code, so information from a point target occurs every 64th bit.

Figure 21:
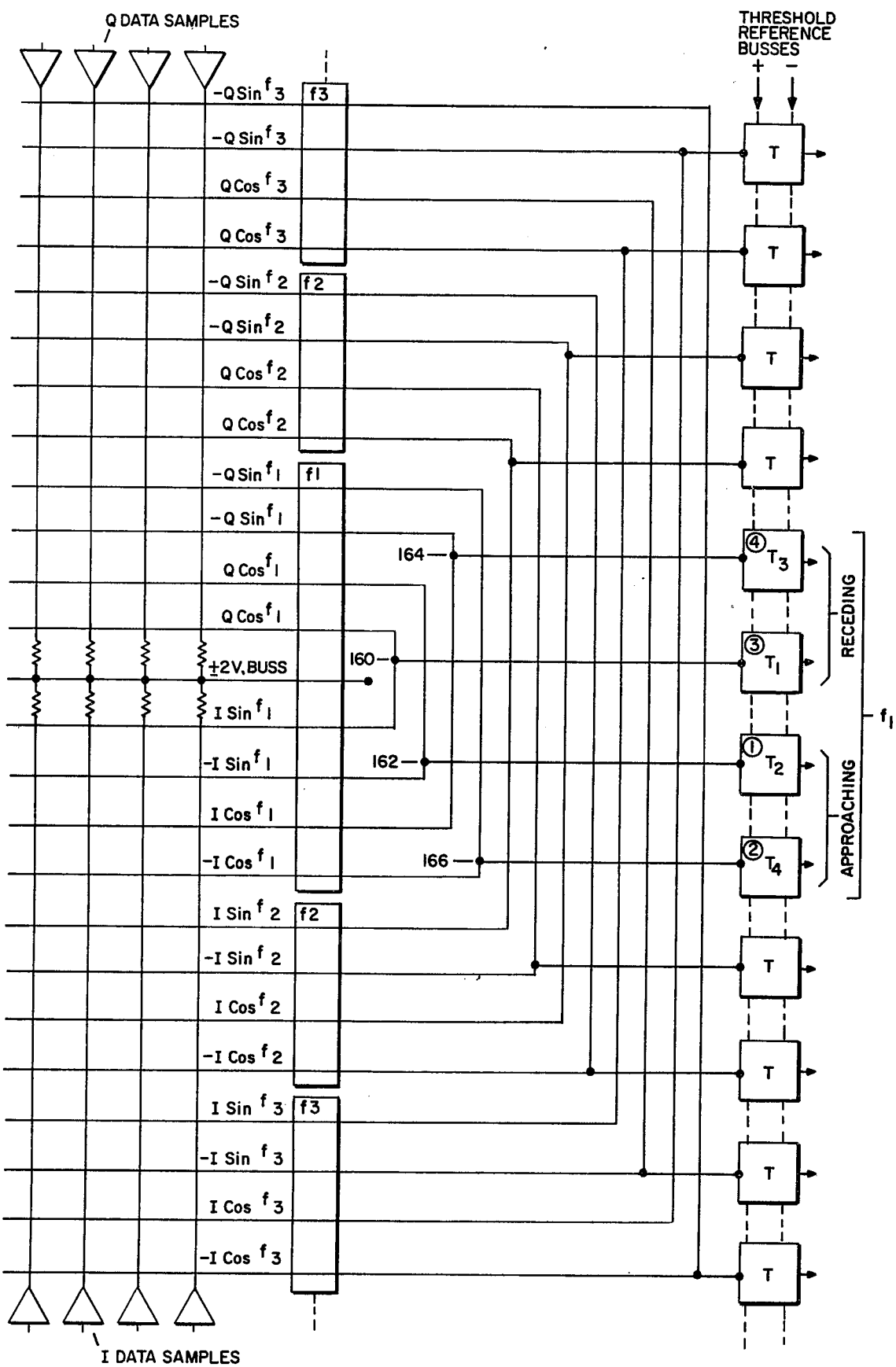
FIG. 21 is a schematic diagram illustrating a doppler direction summing matrix and multiple threshold detectors for indicating the existence of doppler frequency shifts of a predetermined frequency and direction.

The correlator matrix and drive circuitry illustrated in FIG. 20 is but one half of the system utilized in driving the summation matrix of FIG. 21. The summation matrix requires both I and Q data as can be seen by the various components of the doppler direction expression. Thus, the $I_{video}$ is coupled to one matrix correlator while the $Q_{video}$ signal is coupled to another matrix correlator. The outputs from these correlators are combined and used as input signals to the doppler direction matrix. Thus two correlator matrices on a common printed circuit board can be used to determine not only the doppler frequency shift but also doppler direction. If only the doppler frequency shift were to be determined only one correlator matrix would be necessary and it would be necessary to threshold only the sine and cosine functions for the various frequencies involved.

Referring now to FIG. 21, it can be seen that selected outputs from the correlators may be applied to the appropriate summation matrix lines as illustrated. As discussed in connection with FIG. 8, a +2 volt bus is provided to form the 0 threshold level. It will be seen that, for instance, Q cos $f_1$ is summed with I sin $f_1$ to implement expression (3) of the algorithm at the bottom of FIG. 19. Likewise, Q cos $f_1$ and $-$I sin $f_1$ are summed to implement expression (1) of the algorithm at the bottom of FIG. 19. Additionally, $-$Q sin $f_1$ and I cos $f_1$ are summed to implement expression (4) of algorithm at the bottom of FIG. 19. Finally, $-$Q sin $f_1$ and $-$I cos $f_1$ are summed to implement expression (2) at the bottom of FIG. 19. The summation points are illustrated by points 160, 162, 164 and 166. These sums are then coupled to corresponding threshold circuits herein labeled $T_1$, $T_2$, $T_3$, and $T_4$, respectively. These threshold circuits are provided with + and reference buses such that a ±1 condition on any one of the summation points will be indicated by a signal at the output of an associated threshold circuit. Thus, an output signal at threshold circuit $T_2$ or $T_4$ indicates a target approaching at a speed corresponding to the doppler shift $f_1$. If there is an output signal from threshold circuits $T_1$ or $T_3$ the target is receding at a speed corresponding to the doppler shift $f_1$. It will be appreciated that this summing process can be implemented for all doppler frequencies which are of interest, with the outputs from associated thresholding circuits indicating the speed and direction (radial velocity) of a target.

The rectangles surrounding the various matrix sum lines indicate the doppler shift frequency of the signals on the lines encircled and are for convenience in interpreting the drawings. No piece of apparatus is denoted by these rectangles.

The matrix can obviously be expanded to accommodate any number of doppler frequency shifts. Moreover, the matrix may easily be fabricated by the same printed circuit etching techniques used for fabricating the correlator portion of the capacitor matrices. Moreover, the interconnection between selected correlator matrix summing buses and the appropriate input lines to the doppler direction summation matrix may be accomplished via appropriate printed circuit techniques so that a unitary structure is formed. It is therefore contemplated that both the summing buses for the correlator matrix and the doppler direction summation matrix buses be fabricated on the same printed circuit board.

It will be appreciated that both the capacitor matrix and the doppler direction summation matrix offer completely passive processing of the I and Q signals from the radar receiver. The speed of this processing is at least 1,000 times faster than an analoguous fast Fourier transform (FFT) signal processing system.

f. Hybrid Range Gating System

As noted hereinbefore, it is customary in pulse doppler radar to gate ON the receiver of the radar a predetermined time after a transmitted pulse, thereby to determine the distance of the target from the radar via the round trip travel time of the pulse. For resolution of a large number of target ranges, simultaneously, it is necessary to provide a large number of range gates in which the receiver is gated ON for a large number of different time intervals called "windows", the presence of a signal within a predetermined window indicating the presence of a target at the corresponding range.

The above generic description describes apparatus which is not only cumbersome but expensive. The subject system eliminates the need for conventional range gates by providing phase coding of the pulse doppler signal and a simplified "slide by" correlation system. In one aspect, the system provide conventional range gating for one range, e.g., for instance 7 nautical miles (nm), and then in the nature of fine tuning detects subranges within the 7 nm window by phase coding the transmitted pulse in segments. In the illustrated embodiment there are 7 phase coded segments, each corresponding to one nautical mile. The decoding of the phase code is accomplished prior to doppler shift correlation by the capacitor matrix so that only one matrix is necessary for targets having a wide variety of ranges.

Figure 22:
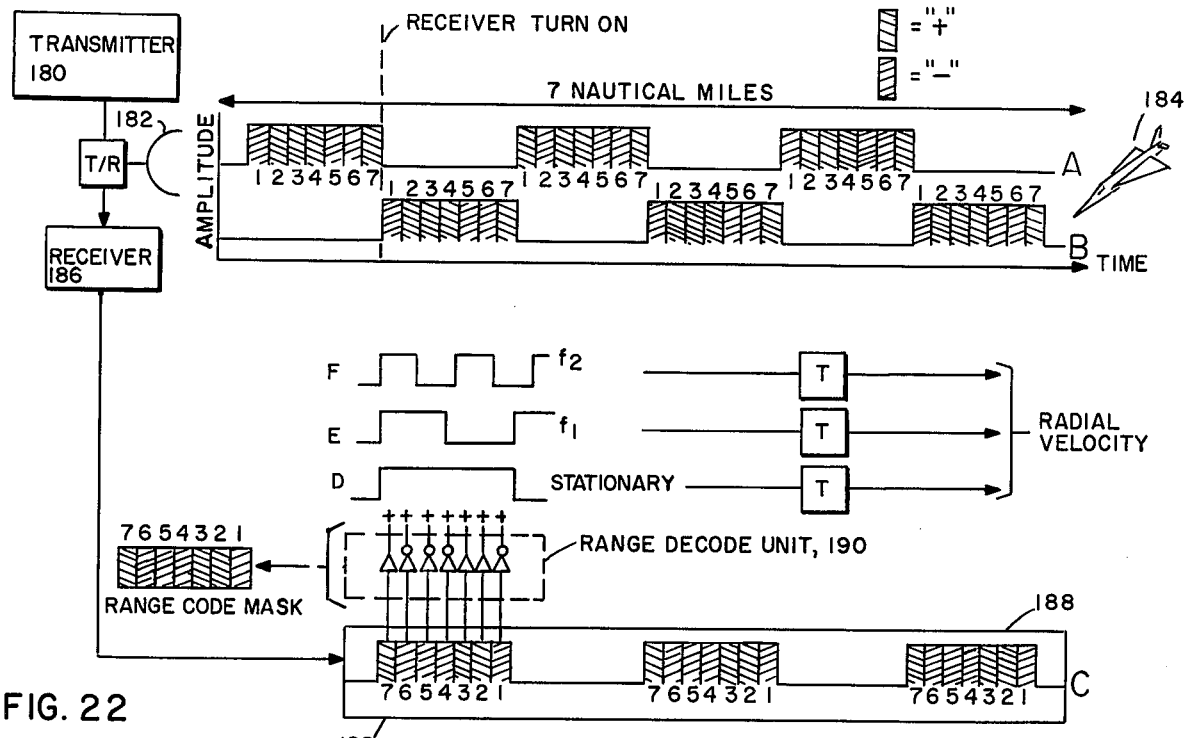
FIG. 22 is a block and schematic diagram illustrating the coding and decoding system utilized in determining the range of a given target.

By way of illustration and referring to FIG. 22, in the subject system transmitter 180 produces a phase-coded pulse doppler signal which is transmitted as waveform A from an appropriate directional antenna 182 towards a target 184. The signal is characterized in this case by a pulse having been divided up into seven segments, where in reality it may be divided into several hundred segments. Each of the segments contains a packet of waves having a carrier frequency $f_c$. The waves in each packet are either phase shifted 180° with respect to the original carrier or not, to provide the phase coding. The particular coding system, described for illustration only, indicates that the wave in packets 2, 3, 4, and 7 are 180° shifted with respect to packets 1, 5 and 6.

The length of time for which a given packet is transmitted corresponds exactly to a range of 1 nautical mile for this illustrative example. In this embodiment the radar receiver is activated coincident with the trailing edge of the transmitted pulse. As will be seen the number of packets which are detected after the receiver is turned ON corresponds to the distance of the target from the radar. For example, if 7 packets are detected, the target is at 7 nautical miles. If only 4 packets are detected, the target is at 4 nautical miles.

As will be described, while the frequency of the return signal, herein illustrated as waveform B, may increase or decrease due to doppler shift, the phase information carried as the phase code modulation on the transmitted signal will be preserved. Thus, the return signal, as indicated by waveform B, carries the same phase code as the transmitted signal. plus the doppler frequency if any exists. Waveform B is received at antenna 182 and is coupled to receiver 186 which generates an electrical signal in which the phase coding and doppler are preserved as illustrated by waveform C. This signal is applied to a shift register 188 such that the signal is shifted down the shift register as illustrated. The outputs of the first seven segments of the shift register 188 are coupled to a range decode unit 190 which is comprised of either inverting or non-inverting amplifiers to provide a range code mask. It is the function of the range decode unit to pass signals only when the code of a pulse matches the corresponding code of the mask. The outputs of the range decode amplifiers are then coupled to the aforementioned driver amplifiers for the capacitor correlation matrix. Alternatively the range decode amplifiers may serve as drivers for the capacitor correlation matrix.

As illustrated in FIG. 22, upon registration of the input pulse code within the range code mask, should the target be stationary, the output from the range decode unit will take on the waveform illustrated by waveform D. Should the target be moving with respect to the radar, then waveform E would be produced assuming a doppler shift frequency $f_1$. Likewise assuming a doppler shift frequency $f_2$, then the waveform F would appear at the output of the range decode unit 190. In essence the purpose of the range decode unit is to pass signals having the appropriate range code while preserving the doppler information. Thus, a signal coupled to the capacitor correlator matrix would be exactly the same as described hereinbefore assuming the target to be 7 nautical miles from the radar.

In this case when the receiver is gated ON waveform C results, and forms the input signal to the shift register. This input signal is decoded in such a manner that the range information is removed from the signal prior to its application to the capacitor correlator matrix. How this is accomplished is explained with reference to FIG. 23.

Figure 23:
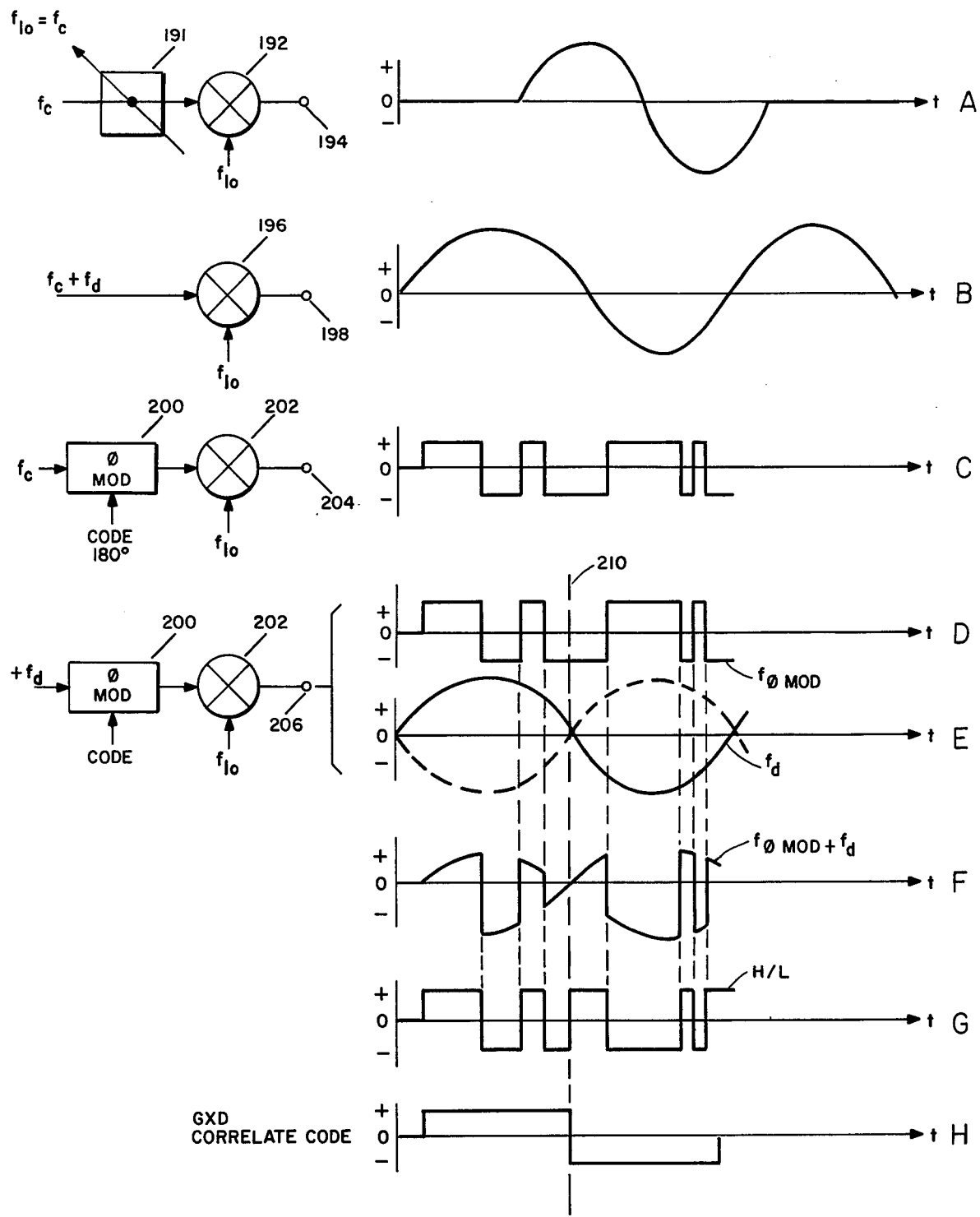
FIG. 23 is a combined block diagram and waveform representation illustrating the decoding of range information while at the same time preserving information containing the doppler shift frequency and direction.

Turning now to FIG. 23, it is important to understand how the returned signal containing doppler and phase code information is processed to provide a signal from which both range and doppler are easily extracted in one operation by the range decode unit. Considering waveform A of FIG. 23, assuming that the local oscillator frequency, $f_{lo}$ is equal to the carrier frequency, $f_c$, then if one were to linearly phase shift the carrier as by a linear phase shifting circuit diagrammatically illustrated by the reference character 191, assuming the multiplication of this signal at multiplier 192 by the local oscillator signal, waveform A would result. Waveform A is a graph of amplitude versus time of the output signal at terminal 194.

As can be seen, a linear shifting of the phase of the carrier results in a sinusoidal change of the output voltage at terminal 194.

Referring to the apparatus opposite the waveform B signal, the situation is illustrated when there is a doppler shift and no phase modulation of the carrier. In this case the incoming signal is composed of frequencies $f_c$ plus $f_d$ (the doppler frequency shift) which when multiplied at 196 with the local oscillator signal $f_{lo}$ (which equals $f_c$) produces a signal at output terminal 198 which is a sine wave having the doppler frequency.

Referring now to the apparatus opposite waveform C assuming that the carrier signal is phase modulated by a rapid or instantaneous phase shift of 180° as opposed to the linear shift imparted by phase shifter 190, then with a rapid 180° phase shift imparted by phase modulator 200 and assuming that this signal is multiplied at a multiplier 202 by a local oscillator signal $f_{lo}$, then the output at output terminal 204 is that illustrated by waveform C. It will be appreciated that with the rapid 180° phase shifting, the signal that results is in the form of a pulse train with the pulse code corresponding to the phase code imparted by modulator 200.

Combining the situation with respect to both the doppler shift and the phase code modulation, the situation is illustrated by the apparatus opposite waveforms D and E. Assuming the same type modulator 200 as illustrated immediately above; assuming also an incoming signal having a carrier frequency $f_c$ plus a doppler shift frequency $f_d$ and assuming the same type of multiplication by multiplier 202, then the output at output terminal 206 has the two components illustrated by waveforms D and E. Waveform D is the phase code modulated signal while waveform E is the doppler signal. When these two signals are combined a composite signal as illustrated by waveform F is formed. Assuming that waveform F is hard limited, a pulsed waveform G is formed.

What is accomplished by the decoding unit is the effective multiplication of waveform G by waveform D which results in waveform H. Waveform G is stored in the shift register and waveform D is stored in decode unit 190 by the arrangement of the inverting and non-inverting amplifiers. Then as can be seen when the part of the waveform G signal to the left of dotted line 210 is multiplied by the portion of the waveform D signal to the left of dotted line 210, there is a +1 output at each corresponding amplifier. This is because there is 100% correlation between waveforms G and D to the left of dotted line 210. The positive correlation is indicated by the positive going portion of waveform H. The situation is exactly the opposite with respect to the portions of these signals to the right of dotted line 210 and there is a 0 output from corresponding amplifiers due to the zero correlation. This is indicated by the negative going portion of waveform H. Note that waveform H is exactly the two level representation of the doppler frequency shift. This signal may therefore be directly coupled to the capacitor correlator matrix. The doppler correlation (as opposed to the range correlation) may thus proceed as described hereinbefore for a decoded range of 7 nautical miles.

What has been described thus far relates to a target at one predetermined range, e.g. 7 nautical miles corresponding to the 7 packets or segments of the transmitted pulse. The situation remaining to be described is the situation in which the target is at some distance closer than 7 nautical miles.

Figure 24:
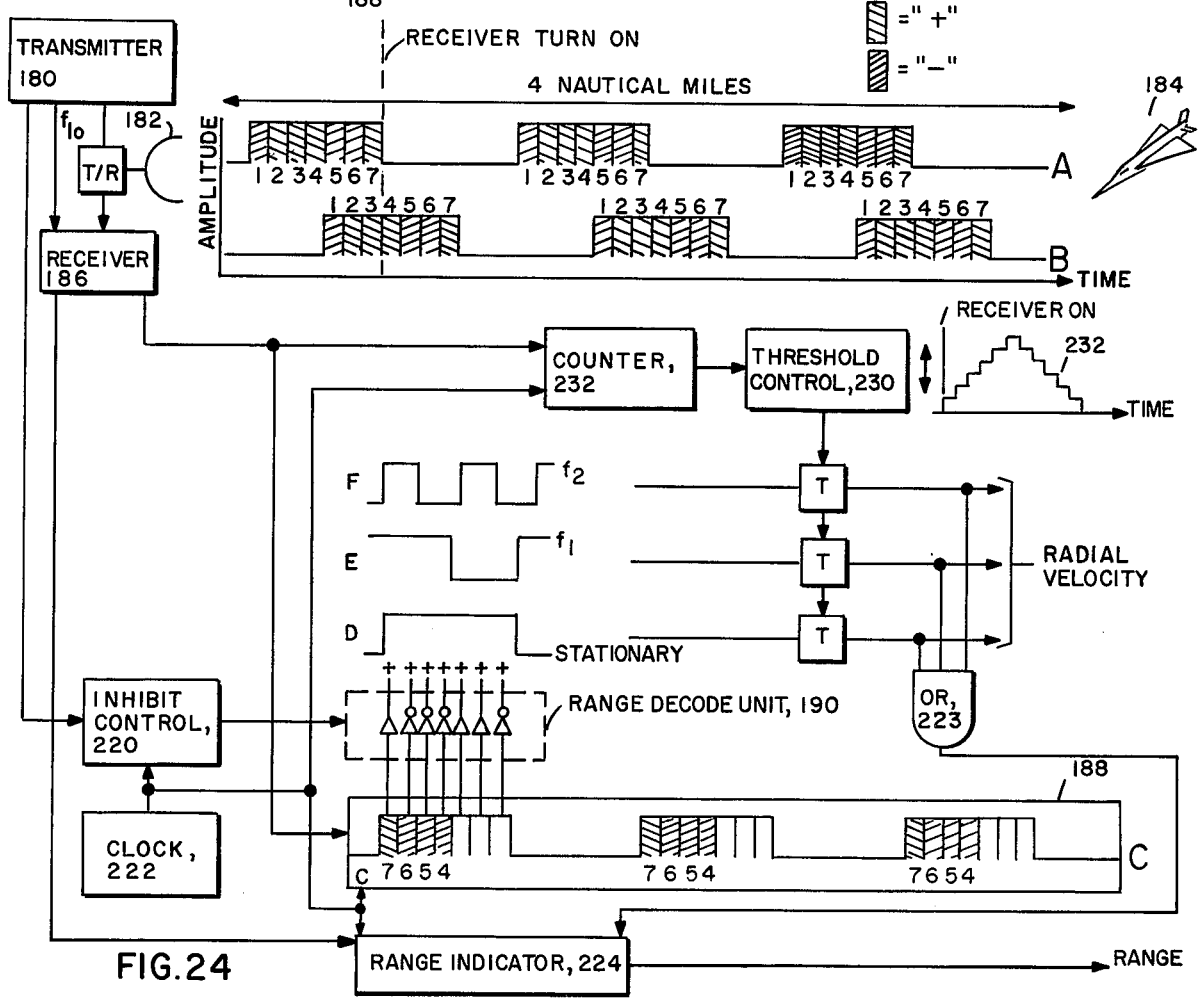
FIG. 24 is a combined block and schematic diagram illustrating the system for generating range information dependent upon the existence of a positive correlation and the number of unblanked drivers at the time of the positive correlation.

Referring now to FIG. 24, assuming the same transmitter, receiver, antenna and target as illustrated in FIG. 22, however, with the target at 4 nautical miles as opposed to 7 nautical miles, and assuming the same coding system as described in connection with FIG. 22, then if the receiver is turned ON as illustrated, it will be appreciated that with respect to waveform B, phase coded pulses 1, 2, and 3 are lost or eclipsed. This portion of the pulse doppler signal is lost because the target is closer to the radar by a distance of 3 miles, and these phase coded pulses are returned to the radar before the receiver is tuned ON. Thus, when the receiver is turned ON only pulses 4, 5, 6 and 7 are shifted down shift register 188 which is clocked by clock 222. The clock rate is the same as the code rate, e.g., the spacing between clock pulses is the length of time for an electro-magnetic wave to travel one nautical mile. An "A" or "PPI" scope 224 may be provided which may be a part of display 28 of FIG. 1. This scope is clocked at the code rate and is started when the receiver is tuned ON. At the end of 4 clock pulses the waveform in the register matches the range mask code and one of the capacitor correlator matrix thresholds will have been exceeded. A signal indicating this event is transmitted through OR gate 223 to the scope and the scope indicates a target at 4 nautical miles.

During the time when pulses are eclipsed, e.g., when the transmitter is ON, random signals are being clocked into shift register 188. This provides false data. False data is ignored by the subject system because all amplifiers are inhibited during the transmit cycle. This is accomplished by inhibit control circuit 220 which sequentially blanks and unblanks the amplifiers of the decode unit. This provides a blanking zone commensurate with the transmit cycle which travels down the amplifiers associated with the shift register. For each clock pulse from clock 222 after receiver turn ON the inverting and non-inverting amplifiers are unblanked in sequence at the code rate starting from left to right. This provides unblanked amplifiers only during the receive cycle, e.g. at times when return signals are present. This prevents false signals from being processed by the capacitor matrix.

The unblanking process in addition to providing false signal protection also provides a range determination function. It will be apparent in the illustrated example that on the fourth unblanking a correlation occurs. Unit 224 in essence senses the number of unblankings to produce the correlation and therefore the range is determined (e.g., four unblankings = 4 nautical miles). Therefore, if 4 inverting or non-inverting amplifiers have been unblanked this indicates that the target rather than being at 7 nautical miles is at 4 nautical miles. It can therefore be seen that by indicating the number of unblanked inverting or non-inverting amplifiers at correlation, the range of the target may be sensed and therefore indicated. In the identical manner inhibiting is accomplished for targets beyond 7 nautical miles. Thus any system for indicating the number of unblanked amplifiers at correlation provides range information and the range indicator is not limited to the use of a PPI or "A" scope.

Figure 25:
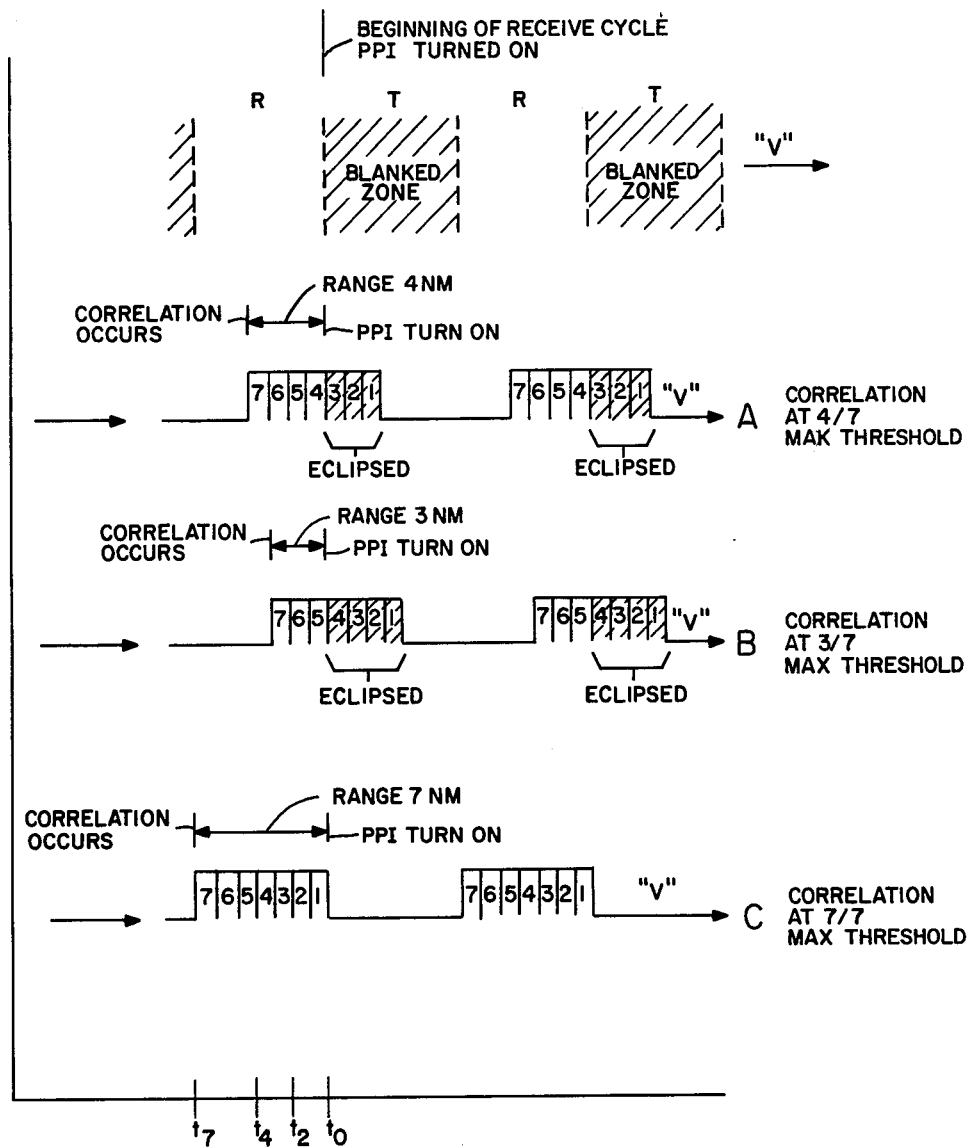
FIG. 25 is a diagram illustrating the travel of the blanking zone and the input signal to the data storage register of FIG. 24.
Figure 26:
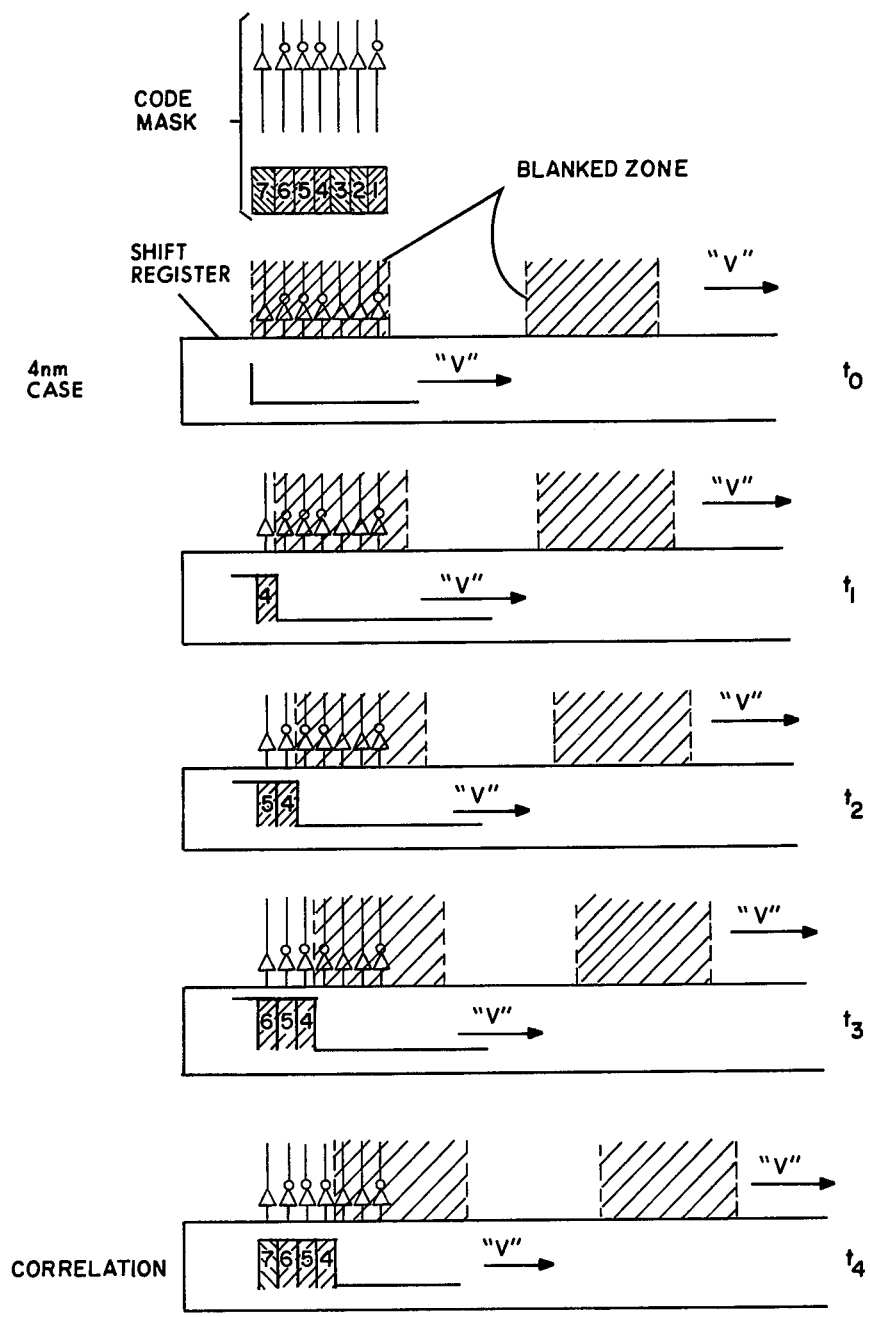
FIG. 26 is a diagram illustrating in greater detail the function of the range decode unit.

A graphic illustration of the determination of range is presented in FIGS. 25 and 26. Referring now to FIG. 25, a timing diagram is illustrated in which the direction of travel of the blanking zone and the direction of travel of the pulses applied to shift register 188 is from left to right. As mentioned hereinbefore, the inverting and non-inverting amplifiers are sequentially blanked and unblanked in accordance with the transmit and receive cycles. This corresponds to a blanking zone of a predetermined width traveling down the inverting and non-inverting amplifiers from left to right as indicated by the shaded portion at the top of the FIG. 25 diagram.

Simultaneous with the traveling of the blanking zone from left to right an input signal to shift register 188 travels from left to right. The velocity, $v$, of travel of the blanking zone and the input signal is the same, such that the trailing edge of the input signal lags the trailing edge of the blanking zone by a distance corresponding to the range of the target. For instance, as indicated by waveform A, since pulses 1, 2, and 3 arrive during the transmit cycle they are eclipsed. What is received after the receiver is turned ON is a signal containing only pulses 4, 5, 6 and 7. Thses occupy a space equivalent to a range of 4 nautical miles as indicated by the double ended arrow immediately thereabove (measured from the trailing edge of the blanking zone to the trailing edge of the input signal).

Referring to waveform B, this waveform corresponds to a target at a range of 3 nautical miles. It will be appreciated that as of the receiver turn ON time pulses 1, 2, 3, and 4 have been eclipsed leaving pulses 5, 6, and 7, the length of which corresponds to a range of 3 nautical miles.

Referring to waveform C, the target is at 7 nautical miles such that there are no eclipsed pulses and the range as indicated by the double ended arrow to include all the pulses.

One factor will be clear from observation of the FIG. 25 diagram. When a target is at 4 nautical miles, correlation can only occur for pulses 4, 5, 6, and 7. Pulses 1, 2, and 3 are eclipsed and therefore the signal on the summing bus of the capacitor matrix correlator will be lower by the amount which would have been contributed by the eclipsed pulses. The threshold detector at the downstream end of the capacitor matrix correlator must be adjusted accordingly such that for targets at 4 nautical miles the threshold must be reduced to 4/7 of the maximum threshold (e.g., the threshold at 7 nautical miles). Likewise, for a target at 3 nautical miles the threshold must be adjusted to 3/7 of the maximum threshold because 4 of the returned pulses will have been eclipsed and therefore cannot contribute to the correlation.

Referring back to FIG. 24 an adaptive threshold is provided by a threshold control circuit 230 which produces a stepped increase and then a stepped decrease in threshold voltage as indicated by waveform 232. The stepping of this waveform starts with the turn ON of the receiver. Threshold control circuit 230 is controlled by a counter 232 which is clocked at the code rate by clock 222 and which is enabled by a pulse from receiver 186 when receiver 186 is turned ON. The first time interval after the receiver is turned ON corresponds to 1 nautical mile. During this time interval the threshold level is at its lowest. This threshold is step increased for each nautical mile (e.g., each clock pulse) until the maximum threshold at 7 nautical miles is reached. These steps correspond exactly to the travel of the input signal down the shift register 188 such that the threshold voltage is appropriately increased to recognize correlation at each successively greater range. During the transmit cycle the threshold is successively decreased to the appropriate level for the next receive cycle.

Referring now to FIG. 26 a sequential timing diagram illustrates the travel of an input signal down the shift register for 4 successive time intervals after the receiver is turned ON. At the top of this diagram is a code mask illustrating the particular coding which is to be recognized. In the 4 nautical mile case, as explained before, the first three return pulses are eclipsed. Thus the first pulse entering the shift register will be pulse No. 4. The blanking zone trailing edge is always in alignment with the leading edge of the first uneclipsed pulse such that all noise occuring before the first uneclipsed pulse is inhibited by the blanked amplifiers. As in FIG. 25, the blanking zone and the received pulse train move to the right.

Referring to the $t_1$ time period it will be apparent that pulse No. 4 has entered the shift register and that the blanking zone has moved one space to the right thereby unblanking the first of the amplifiers ahead of any first incoming pulse. It will be appreciated from inspection of this diagram that pulse No. 4 does not match the code mask as the code mask at this position is code No. 7.

Referring to the $t_2$ time interval, the first pulse has been shifted one position to the right and pulse No. 5 now occupies the first portion of the shift register. It will be noted here that while pulse No. 4 matches code pulse No. 6, pulse No. 5 does not match code pulse No.

7 with which it is aligned. Thus there is insufficient voltage applied to a sum line in the capacitor matrix correlator to indicate correlation.

Referring to the $t_3$ time interval, it will be appreciated that all signals have been shifted to the right with the addition of pulse No. 6. Pulse No. 6 does not match code pulse No. 7 and no correlation is indicated. Finally at time interval $t_4$ pulses 4, 5, 6 and 7 match code pulses 4, 5, 6 and 7 and correlation is indicated by the exceeding of a predetermined threshold. Time interval $t_4$ is thus clearly delineated as the time at which correlation occurs. The output of the appropriate threshold detector is coupled to an A or PPI scope which has started its clocking at the beginning of the receive cycle. Thus a signal at time $t_4$ when used to energize the scope produces an indication that the target is at 4 nautical miles.

To summarize what has been accomplished is that the amplifiers have been sequentially unblanked in synchronism with the incoming pulse train such that noisy signals occuring during eclipsing or occuring during the transmit cycle are inhibited. Moreover, the length of time that it takes for the incoming signal to travel down the shift register and become correlated exactly corresponds to the range of the target, with the time interval being measured between the time that the receiver is turned ON and the time that correlation occurs. Alternatively, the number of unblankings at correlation can be sensed to give an indication of range.

Figure 27:
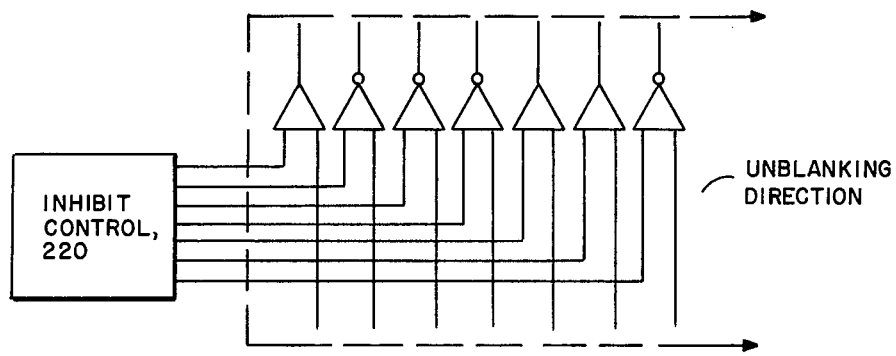
FIG. 27 is a schematic block diagram illustrating the direction of unblanking of the drivers to the capacitor correlator matrix.

Referring to FIG. 27, it can be seen that the drivers utilized for the capacitor matrix may also be utilized as the inverting and non-inverting amplifiers for both decoding the range and for performing the inhibiting function.

As will be recalled in connection with the description of FIG. 8, when an inhibit pulse is applied to a driver the output terminal of the driver exhibits a high impedence. This permits the application of a two volt signal onto the corresponding column, which as will be recalled, is the zero voltage reference for the correlator matrix. The drivers for the matrix may be made inverting or non-inverting simply by placing a conventional inverter circuit at the output terminal of the driver. Alternatively, a conventional inverter may be placed on the input terminal of the driver so as to effectuate by one set of circuitry, both the drive and the decode functions.

In another embodiment the doppler and code can be simultaneously decoded passively within the matrix precluding the need for active inverters. It is recognized that in the latter case flexibility on selecting this code dynamically is sacrificed because the code is built into the matrix.

Figure 28:
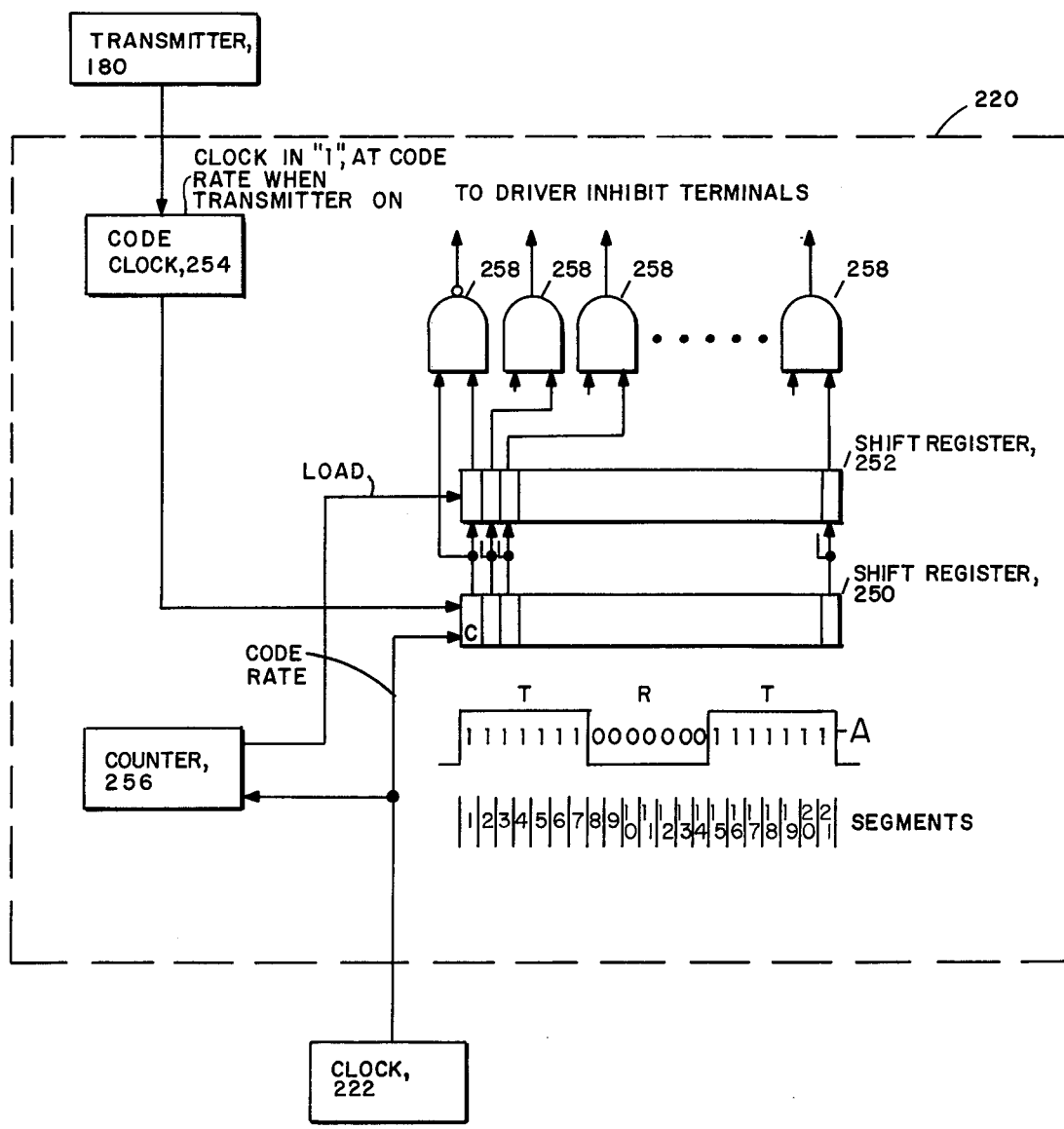
FIG. 28 is a schematic diagram of unit 220 of FIG. 21.

Referring now to FIG. 28, the operation of one circuit for performing the inhibit control function is described.

It is the purpose of this unit to sequentially unblank a set of drivers during the receive cycle (in this case, 7 nautical miles) and then to cause these drivers to be inhibited during the transmit cycle (in this case the succeeding 7 nautical miles). For this purpose, the inhibit control unit 220 is provided with 2 shift registers, 250 and 252 of equal length. The length of the shift registers may be such that a number of transmit and receive cycles can be stored and processed. A code clock 254 produces logic level 1 signals at the code rate when transmitter 180 is turned ON. This results in a logic level 1 signal for the duration of the transmitted pulse and a logic level 0 signal for the period when the receiver is ON which establishes the transmit/receive cycle. The signal is applied to the input terminal shift register 250 such that a waveform A is stored in shift register 250 and is shifted to the right with each clock pulse from clock 222. Shift register 250 is clocked at the code rate by clock 222. Clock 222 also clocks a counter 256 which counts down clock 222 by a predetermined number usually corresponding to the number of transmit and receive cycles to be processed. The output of counter 256 is applied as a LOAD command to the load terminal of shift register 252. In response to the LOAD command, the output of shift register 250 is periodically read (with an inversion) in parallel into shift register 252. In one embodiment counter 256 is set such that shift register 250 is fully loaded prior to the readout of shift register 250 into shift register 252. The output from like segments of shift registers 250 and 252 are coupled to respective input terminals of corresponding two input terminal AND gates 258.

Assuming a 7 bit transmit cycle, followed by a 7 bit receive cycle as illustrated, taking the first segment of each shift register it will be appreciated that the input to the corresponding AND gate is the output of shift register 250 and the output of shift register 252. For the first segment corresponding to the first bit, assuming a transmit cycle as illustrated by waveform A, the output of the first segment of the shift register 250 will be a logic level 1 signal which is applied to one input terminal of the corresponding AND gate while the output of the first segment of shift register 252 will be a logic level 0 signal because of the inversion or transfer. The output of the AND gate will thus be logic level 0 signal and the driver associated with segment No. 1 will be inhibited. Note the other six bits which occured during the transmit time also result in inhibit signals for corresponding segments. The driver corresponding to Bit 8, the first receive bit is also inhibited at this time as are the drivers for all other receive bits because although register 250 has 0's for segments 8–14, register 252 has 1's, and the AND gate outputs corresponding to these bits are still 0. However, on the next clock pulse (corresponding to the beginning of a receive cycle) waveform A will be shifted one segment to the right such that the signal from the first segment of shift register 250 will now be a logic level 0 signal. This logic level 0 signal is applied to the corresponding AND gate 258. The output from the first segment of shift register 252 will still be a logic level 0 signal such that the output of the corresponding AND gate will stay at logic level 0. However, the 8th segment of register 250 corresponding to bit 8 now has a logic 1 signal and the corresponding segment of register 252 now has a logic 1 signal so that the output of the corresponding AND gate goes to a logic level 1 which unblanks the associated driver. As waveform A signal continues to the right with corresponding clock pulses, the drivers for segment 9–14 are sequentially unblanked. This process then starts inhibiting bits at the left edge of the received pulse (segments 8, 9, etc.) until all possible ranges of interest have been examined. Both registers are then cleared to start a new cycle.

What has occurred thus far is that shift register 252 has been loaded when shift register 250 has acquired a full set of transmit/receive cycles. Shift register 252 is then frozen while the transmit/receive waveform continues to pass down shift register 250. Counter 256 can be set such that shift register 252 is updated with new transmit/receive information periodically, with the load command pulse causing the information in shift register 252 to be replaced with the new pulse repetition frequency information in shift register 250. By using two shift registers in this fashion, the system automatically adapts to different code rates or patterns, e.g., different transmit/receive cycles, without alteration of the inhibit control circuitry. The function of the circuit thus far described can be performed by alternative means if the system is to respond to only one code rate, in that the drivers may be unblanked sequentially by any appropriate means responsive to the turn ON of the receiver and inhibited after each receive cycle. The present circuit provides for automatic adaptation to differing code rates and the consequent differing transmit/receive cycles.

It will be appreciated that the inverting and non-inverting amplifiers may be replaced with exclusive OR gates such that the OR gates can be selectively programmed to invert or not invert the inputs thereto from the signal storage register. Thus when in the specification and claims an inverting or non-inverting amplifier is described it will be appreciated that this generically covers the case of an exclusive OR gate as an inverting or non-inverting amplifier.

When using exclusive OR gates in this fashion, the other input to the gate may be derived from a shift register which has stored a predetermined phase code. This arrangement allows variation of the phase code merely by reloading the register. This may be accomplished during the transmit cycle so that real time variation of the range code can be accomplished on a pulse to pulse basis providing further flexibility to the range decoding system.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:

1. A pulse doppler radar having fine range resolution capability comprising:
   means for projecting a pulse of energy including phase coded packets towards a target, the position of each phase coded packet within the pulse correlating to a predetermined range within said pulse,
   means for detecting energy returned from said target including phase coded packets reflected by said target and for generating quadrature signals responsive thereto,
   means for correlating said quadrature signals with a predetermined range code and a predetermined correlation waveform and for producing output signals responsive to the decoding of both said predetermined code, and said predetermined waveform, and
   means responsive to said output signal for producing an indication of the existence of the target at the range corresponding to the number of phase coded packets within a pulse which are decoded by said predetermined range code and the radial velocity of said target.

2. The apparatus of claim 1 wherein said correlation waveform is periodic and has a period corresponding to a predetermined doppler frequency of interest and wherein said correlating means has passive means to perform the signal processing function accomplished thereby.

3. The apparatus of claim 2 wherein said passive means includes a capacitor correlator matrix having a number of different output terminals, each output terminal having a different correlation waveform associated therewith, the amplitude of a signal at an output terminal determining the degree of correlation between an input signal to the correlator and the correlator waveform associated with said output terminal, and doppler direction algorithm implementing means for summing the signals from preselected output terminals of said correlator matrix to produce a signal indicative of the existance of a target returning a signal of a predetermined doppler frequency and the direction of the target returning said last mentioned signal.

4. The apparatus of claim 3 wherein said capacitor correlator matrix includes means for coding said matrix such that the code corresponds to a two level approximation of the predetermined correlation waveform.

5. The apparatus of claim 3 wherein said capacitor correlator matrix includes means for coding said matrix such that the code corresponds to a three level approximation of the predetermined correlation waveform.

6. The apparatus of claim 1 wherein said correlating means includes means for selectively inhibiting the correlation of said quadrature signals during transmission of said phase coded packets.

7. The apparatus of claim 6 wherein said correlating means includes a capacitor matrix correlator, register means for storing said quadrature signals, a plurality of drive means connected between said register means and said capacitor matrix correlator and wherein said selective inhibiting means includes means for sequentially rendering said drive means inoperative.

8. The apparatus of claim 7 wherein said means for producing an indication of the existance of a target includes means responsive to the number of inoperative drive means at the time of production of said indication for indicating the range of said target.

9. The apparatus of claim 8 wherein said range indicating means includes a scope swept in a manner indicating range and started at a predetermined time related to the transmit/receive cycle of said radar.

10. Apparatus for determining the doppler shift of a signal from a target moving with respect to a first location comprising
   means at said first location for detecting said signal and for generating a pulsed waveform signal having a period equal to that of said signal,
   means including a capacitor matrix for comparing the period of said pulsed waveform signal to that of a predetermined periodic waveform and for generating a signal the amplitude of which is indicative of the percent correlation between said pulsed waveform signal and said predetermined periodic waveform, and
   means responsive to the amplitude of said last mentioned signal reaching a predetermined level for indicating correlation of a predetermined percent.

11. The apparatus of claim 10 wherein said comparing means includes means for storing said pulsed waveform signal and means for driving said capacitor matrix in accordance with said stored signal, and wherein said predetermined periodic waveform is stored in the capacitor matrix by the coding thereof.

12. The apparatus of claim 11 wherein said storage means includes a serial shift register connected via said drive means to said capacitor matrix, and means for shifting said pulsed waveform signal down said shift register, whereby a "slide-by" correlation of said pulsed waveform is performed by said capacitor matrix when said pulsed waveform corresponds in position to that represented by the coding of said capacitor matrix.

13. The apparatus of claim 11 wherein said storing and driving means includes means for storing and pulsed waveform signal for a predetermined period of time and for reading said pulsed waveform signal out from said storage means, and wherein said capacitor matrix includes means for coding said matrix such that the signal read out of said storage means is correlated with two waveforms corresponding to said predetermined periodic waveform multiplied by two different trigonometric functions, whereby a pulsed waveform signal read out to such capacitor matrix having a period equal to that of said predetermined periodic waveform results in the amplitude of the signal from said comparing means indicating a correlation of at least a predetermined percent, thereby implementing a "bulk" correlation.

14. The apparatus of claim 11 further including means for generating an inhibit signal and wherein said drive means includes a tri-level driver having an output of two different voltages depending on the level of said pulsed waveform signal stored in a given segment of said storage means and having a high impedance output responsive to the generation of said inhibit signal, said capacitor matrix including a column having one end coupled to said tri-level driver output, a source of d.c. voltage, one side grounded, a resistor connected between the other end of said column and the other side of said d.c. voltage source, and a summing bus crossing said column and spaced therefrom, said column having a tab portion overlapping a portion of said summing bus whereby a change in voltage on said column is coupled to said summing bus.

15. The apparatus of claim 10 wherein said capacitor matrix includes a number of columns spaced one from another in a predetermined plane, and a number of summing buses crossing said column lines and spaced therefrom, selected columns having tab portions overlying selected summing buses to couple voltages on a selected column to a selected summing bus.

16. The apparatus of claim 15 wherein said capacitor matrix is fabricated from two printed circuit boards having said summing buses and columns patterned as conductors thereon, means for mounting said printed circuit boards in apposition such that said conductors form said capacitor matrix, and ground plane means spaced from each set of columns and summing buses exteriorly thereof.

17. The apparatus of claim 11 wherein said capacitor matrix includes pairs of columns with selected columns having tab portions at a predetermined position along the length thereof and a number of summing buses crossing said columns and spaced therefrom, capacitors being formed between said tab portions and the portions of said summing buses overlain by said tab portions.

18. The apparatus of claim 17 and further including means for applying a predetermined voltage on a predetermined one of said pairs of columns in response to a portion of said pulsed waveform signal existing at a predetermined location within said storage means.

19. The apparatus of claim 10 wherein said capacitor matrix includes a number of columns with selected columns having a tab portion at a predetermined position along the length thereof, pairs of summing buses crossing said columns and spaced therefrom, selected summing buses being overlain with a tab portion to form a capacitor, and a differential amplifier having inverting and non-inverting inputs coupled respectively to one and the other of said pairs of summing buses.

20. The apparatus of claim 10 wherein said capacitor matrix includes pairs of columns and further including a number of differential drive means, associated one each with a column pair to provide the columns in said pair with predetermined different voltages responsive to the level of said pulsed waveform signal at a predetermined location and at a predetermined point in time and wherein said voltages are reversed with a reversal in the level of said pulsed waveform at said predetermined location at a different point in time.

21. In a pulse doppler radar system which includes the transmission and receipt of phase coded signals
inverting and non-inverting amplifiers arranged to decode a predetermined pulse code,
means for presenting said phase coded signal to said amplifiers such that such phase coded signal is slid by said amplifiers,
means for sequentially blanking and unblanking said amplifiers in a serial manner responsive respectively to the transmit and receive cycles of said radar, and
means for determining the range of the target by the number of unblanked amplifiers when said phase coded signal is decoded.

22. The apparatus of claim 21 wherein said blanking and unblanking means includes means for unblanking said amplifiers in a sequence starting with the unblanking of the amplifier corresponding to the last segment of said code, whereby the number of unblanked amplifiers is determined by the time interval between the first unblanking of an amplifier and the time when said phase coded signal is decoded.

23. In a pulse doppler radar system, passive means for determining the radial velocity of a target from which radar signals are returned, said passive means including a capacitor matrix and a summation matrix coupled thereto, whereby the speed of the target and whether the target is approaching or receding is determined by passive means.

24. In a pulse doppler radar system which includes the transmission and receipt of phase coded signals
inverting and non-inverting amplifiers arranged to decode a predetermined pulse code, and
means for presenting said phase coded signal to said amplifiers such that said phase coded signal is slid by said amplifiers, an output signal from an amplifier indicating receipt of a pulse coded signal corresponding to the code of that amplifier.

25. A pulse doppler radar comprising:
means for projecting energy including phase coded pulses towards a target,
means for detecting energy returned from said target including returned phase coded pulses and for generating quadrature signals responsive thereto,
means for correlating said quadrature signals with a predetermined range code and a predetermined correlation waveform and for producing output signals responsive to the coding of both said predetermined code, and said predetermined waveform, and means responsive to said output signals for producing an indication of the existence of the target at the range corresponding to said predetermined range code and the radial velocity of said target, said correlation waveform being periodic and having a period corresponding to a predetermined doppler frequency of interest, said correlating means having passive means to perform the signal processing function accomplished thereby, said passive means including a capacitor correlator matrix having a number of different output terminals, each output terminal having a different correlation waveform associated therewith, the amplitude of a signal at an output terminal determining the degree of correlation between an input signal to the correlator and the correlator waveform associated with said output terminal, and doppler direction algorithm implementing means for summing the signals from preselected output terminals of said correlator matrix to produce a signal indicative of the existence of the target returning a signal of a predetermined doppler frequency and the direction of the target returning said last mentioned signal.

26. A pulse doppler radar comprising:
means for projecting energy including phase coded pulses towards a target,
means for detecting energy returned from said target including returned phase coded pulses and for generating quadrature signals responsive thereto,
means for correlating said quadrature signals with a predetermined range code and a predetermined correlation waveform and for producing output signals responsive to the decoding of both said predetermined code, and said predetermined waveform, and
means responsive to said output signals for producing an indication of the existence of the target at the range corresponding to said predetermined range code and the radial velocity of said target, said correlating means including means for selectively inhibiting the correlation of said quadrature signals during transmission of said phase coded pulses.

27. The apparatus of claim 26 wherein said correlating means includes a capacitor matrix correlator, register means for storing said quadrature signals, a plurality of drive means being connected between said register means and said capacitor matrix correlator and wherein said selective inhibiting means includes means for sequentially rendering said drive means inoperative.

* * * * *